(12) United States Patent
Bender et al.

(10) Patent No.: US 6,341,276 B1
(45) Date of Patent: Jan. 22, 2002

(54) SYSTEM FOR SELECTING A COMPUTER SOLUTION FROM A PRE-DEFINED SET

(75) Inventors: Craig Samuel Bender; John James Shedletsky, both of Brewster, NY (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 08/397,292

(22) Filed: Mar. 1, 1995

(51) Int. Cl.$^7$ .................................................. G06N 5/04
(52) U.S. Cl. ............................ 706/50; 706/10; 706/21; 706/45
(58) Field of Search ............................. 395/51, 22, 50, 395/23; 364/513

(56) References Cited

U.S. PATENT DOCUMENTS

| | | | |
|---|---|---|---|
| 4,591,983 A | * | 5/1986 | Bennett et al. ............. 364/400 |
| 4,656,603 A | | 4/1987 | Dunn |
| 4,873,643 A | | 10/1989 | Powell et al. |
| 4,992,940 A | * | 2/1991 | Dworkin ...................... 364/401 |
| 5,072,412 A | | 12/1991 | Henderson, Jr. et al. |
| 5,129,082 A | | 7/1992 | Tirfling et al. |
| 5,201,047 A | * | 4/1993 | Maki et al. .................. 395/600 |
| 5,204,947 A | | 4/1993 | Bernstein et al. |
| 5,208,745 A | * | 5/1993 | Quentin et al. ............. 364/188 |
| 5,212,792 A | | 5/1993 | Gerety et al. |
| 5,278,751 A | | 1/1994 | Adiano et al. |
| 5,297,249 A | | 3/1994 | Bernstein et al. |
| 5,301,270 A | | 4/1994 | Steinberg et al. |
| 5,321,808 A | | 6/1994 | Rupp |
| 5,325,533 A | | 6/1994 | McInerney et al. |
| 5,339,433 A | | 8/1994 | Frid-Nielsen |
| 5,361,350 A | | 11/1994 | Conner et al. |

FOREIGN PATENT DOCUMENTS

| | | |
|---|---|---|
| JP | 6044060 | 2/1994 |
| SU | 1099316 | 6/1984 |

OTHER PUBLICATIONS

Cowart, "Mastering Windows 3.1," SYBEX, p. 4–8, 38, Dec. 31, 1992.*

IBM Technical Disclosure Bulletin vol. 36, No. 1, 1/93, pp. 86–93, "OS/2 Database Manager Import/Export Utility Message Handling In Client/Server Environment", by Alexander et al.

IBM TDB vol. 37, No. 9, 9/94, pp. 79–82, "Object Attributes on Demand in a Cooperative Processing Environment", by Duffield et al.

IBM TDB vol. 24, No. 6, 11/91, pp. 2708–2709, "English Level Flowcharting/Programming System", by Schwartz.

IBM TDB vol. 35, No. 4A, 9/92, "Lan–Based Customer Requirements Tracking Tool", pp. 308–309, by Catino et al.

IBM TDB vol. 37, No. 3, 3/94, "User Interface Technique for Selecting Multiple Interface Themes", pp. 635–638, by Haddon et al.

IBM TDB vol. 37, No. 9, 9/94, "Administration of Graphic User Interface and Multimedia Objects using Cooperative Processing", pp. 675–678, by Duffield et al.

IBM DOSS, AT990031, "Dynamic Manufacturing Process Control", by Raines et al.

IBM DOSS, FR993001, Automatic Generation of Telecommunications Network Schematics, by Monteil.

IBM DOSS, DA991055, Graphical Numerical Method for Viewing Inputs and Solutions to Equations, by Torres.

IBM DOSS, BT992022, "A User Interface Builder for a User Interface Server", by Toland et al.

* cited by examiner

*Primary Examiner*—Mark R. Powell
*Assistant Examiner*—Todd D. Ingberg

(57) ABSTRACT

An expert system selects a computer solution from a set of predefined, proven solution to meet a specific need. Each of the predefined solutions comprises a plurality of hardware platforms and associated software, and a communication facility between the hardware platforms. The system identifies and directs display of a multiplicity of different characteristics of computer solutions within the set. Then, the user selects one of the characteristics to reduce the number of possible solutions from the set. In response, the system may then display other characteristics which can be selected to further reduce the number of possible solutions from those identified after the one characteristic was selected. According to a preferred embodiment of the present invention, this narrowing process always results in one or more solutions from the set; there are no "dead ends". After the last characteristic is selected, the system identifies and directs display of a final subset of the set corresponding to the selected characteristics.

18 Claims, 29 Drawing Sheets

SYSTEM FOR SELECTING A COMPUTER SOLUTION FROM A PRE-DEFINED SET

BACKGROUND OF THE INVENTION

The invention relates generally to expert systems and deals more particularly with a system for selecting a computer solution comprising hardware platforms, operating systems, applications, data bases, etc. from a pre-defined set to satisfy a specific need.

There are many types and arrangements of hardware platforms, operating systems, applications, data bases, links, protocols, clustering techniques, user device supports, distribution techniques, etc. that are possible today. The type and arrangement can be tailored to a specific business need. For example, members of a purchasing department in a company may need rapid and inexpensive communications with each other and access to a common data base. In such a case, it may be best to provide each member with a workstation, and connect all the workstations in a common network with a common server and common DASD managed by the common server. The problem is more complex considering there are also optimum network hardware and software, purchasing application, data base manager, etc. to select. If there are several such departments, it may be best to provide a like number of such networks and a single host computer connected to all of the network servers. In this extended environment, there is an optimum combination of host computer, communication facility between the network servers and host computer, data base manager for host DASD, etc. Thus, even for a business need with so few basic requirements, there are many possible combinations from which to choose. Naturally, as the requirements increase in number and complexity, there are even more possible combinations to consider. It is difficult and time consuming for a person to determine the optimum system components and arrangement without assistance in view of the many possible combinations. Also, it is difficult to ensure that the final design will work reliably; there may be unforeseen problems.

Accordingly, a general object of the present invention is to provide an automated system for determining the components and arrangement of a computer solution that meets a specific need.

Another object of the present invention is to provide such a system which provides reliable solutions.

SUMMARY OF THE INVENTION

The invention resides in an expert system for selecting a computer solution from a set of predefined, proven solution to meet a specific need. Each of the predefined solutions comprises a plurality of hardware platforms and associated software, and a communication facility between the hardware platforms. The system identifies and directs display of a multiplicity of different characteristics of computer solutions within the set. Then, the user selects one of the characteristics to reduce the number of possible solutions from the set. In response, the system may then display other characteristics which can be selected to further reduce the number of possible solutions from those identified after the one characteristic was selected. According to a preferred embodiment of the present invention, this narrowing process always results in one or more solutions from the set; there are no "dead ends". After the last characteristic is selected, the system identifies and directs display of a final subset of the set corresponding to the selected characteristics.

According to another feature of the present invention, in response to user selection of one of the predefined solutions within the final subset, the system directs display of additional information or graphics about the one predefined solution.

DETAILED DESCRIPTION OF THE PREFERRED EMBODIMENTS

Figure 1:
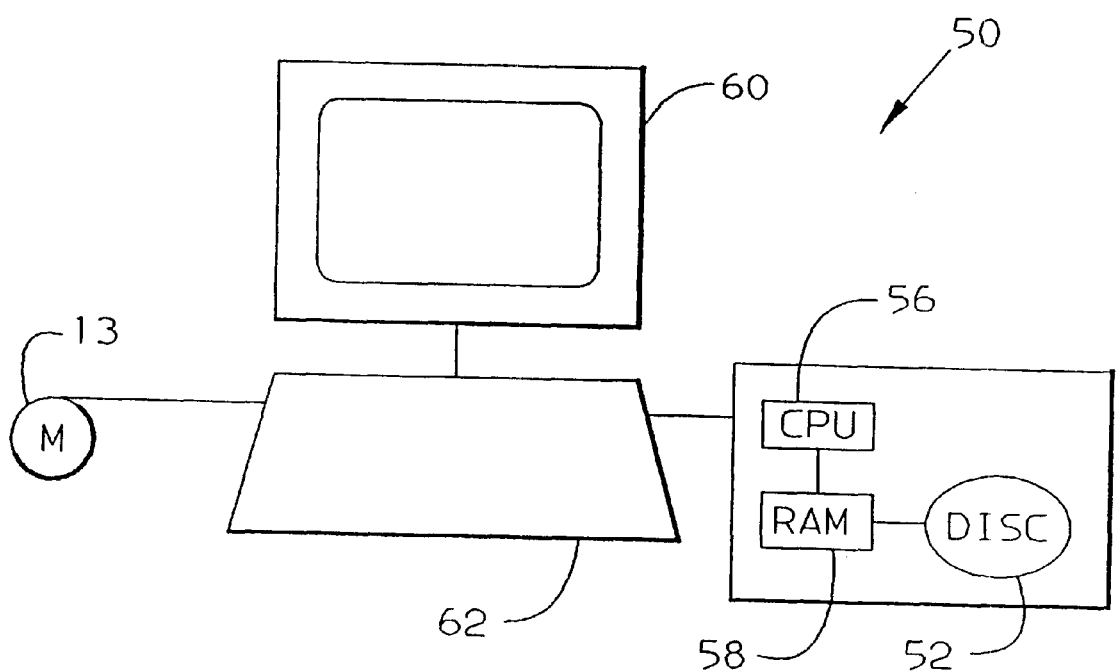
FIG. 1 illustrates an expert system comprising a computer system which is programmed according to the present invention.

Referring now to the Figures in detail wherein like reference numbers indicate like elements throughout the several figures, FIG. 1 illustrates a computer system generally designated 50 including an application program 52 (in object code stored on a hard disk) according to the present invention. By way of example, computer system 50 is a standard personal computer except for program 52, and comprises a CPU 56, RAM 58, a monitor 60, a keyboard 62 and a mouse 63 for making selections from screens on the monitor.

Figure 2:
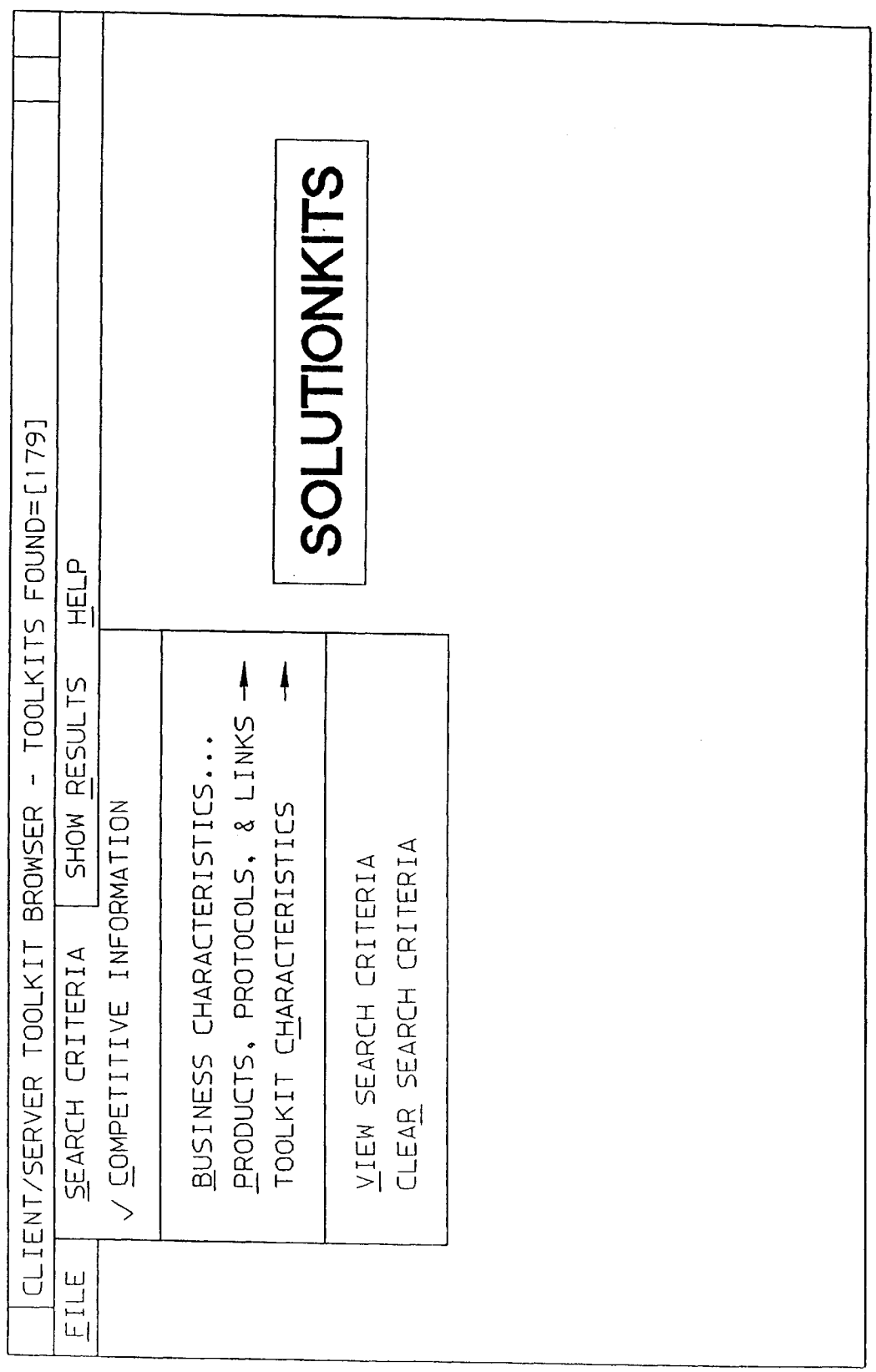
FIGS. 2–25 illustrate various screens generated by the expert system of FIG. 1.

Computer system 50, when executing program 52, forms an expert system for selecting a computer solution or "kit" comprising hardware platforms, operating systems, applications, data bases, etc. from a pre-defined, proven set to satisfy a specific need. The set of pre-defined solutions is also stored on the hard disk. To begin the selection process, program 52 instructs CPU 56 to display an introductory screen with a menu bar, and a user selects "Search Criteria" from the menu bar. This selection causes a pull down menu to appear as illustrated in FIG. 2. Next, the user can select "Business Characteristics" from the pull down menu to begin defining business characteristics of the desired solution. In response, system 50 displays the screen of FIG. 3 which illustrates six possible business characteristics of the desired solution: business value chain, industry, vendor application, systems management, technology and environment.

Figure 4:
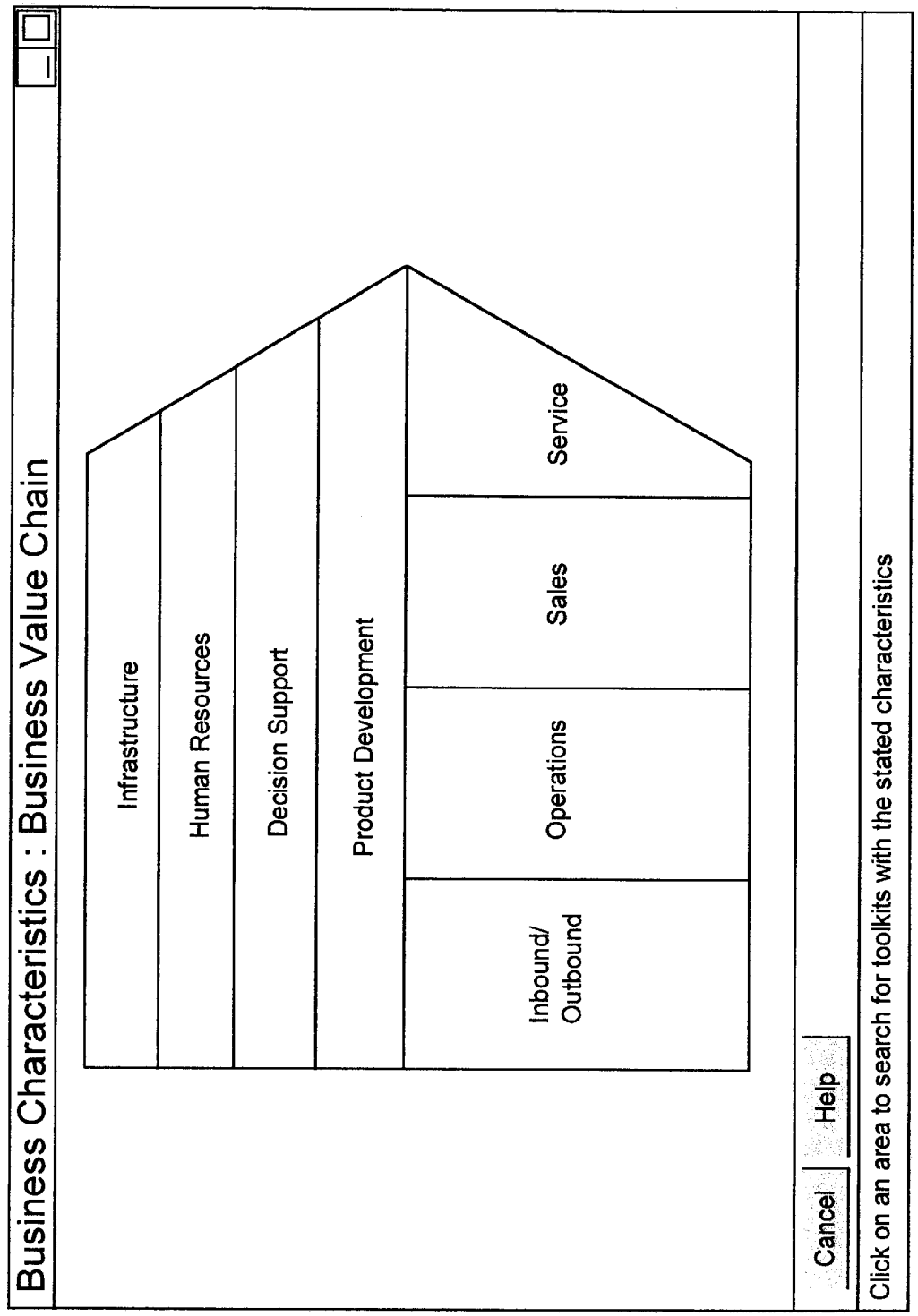
Figure 5:
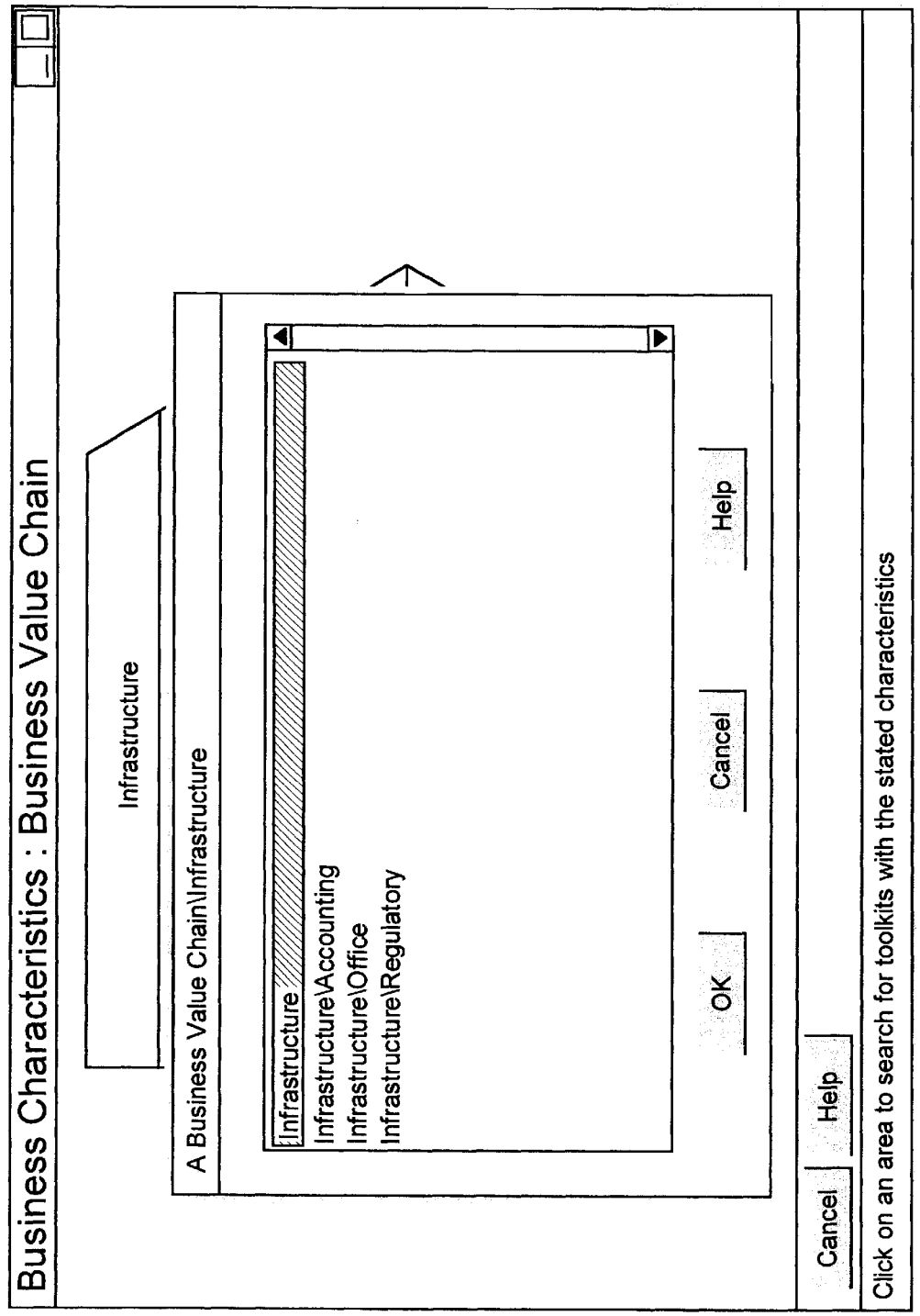

If the user selects "business value chain", system 50 will display the screen of FIG. 4 which illustrates eight possible categories within the business value chain: infrastructure, human resource, decision support, product development, inbound/outbound, operations, sales and service. If the user selects "infrastructure", system 50 will display the screen of FIG. 5 which illustrates three examples ("key phrases") of infrastructure: accounting, office and regulatory. After the user makes a selection from the screen of FIG. 5, system 50 will display a subset list of the predefined solutions classified (or "tagged") as the selected infrastructure. Solution names in the subset list indicate a general description of the solution, a company that uses this solution, or a key technology used in the solution. Then, the user selects a solution kit from the subset list and system 50 displays a graphical image and associated description such as that illustrated in FIG. 20 and described in more detail below. The user can then request that the graphical image be connected to a graphical block diagram such as that illustrated in FIG. 21 and described in more detail below. The user can also request that alternative products and variations in the solution be displayed as illustrated in FIGS. 20–25 and described in more detail below.

Figure 6:
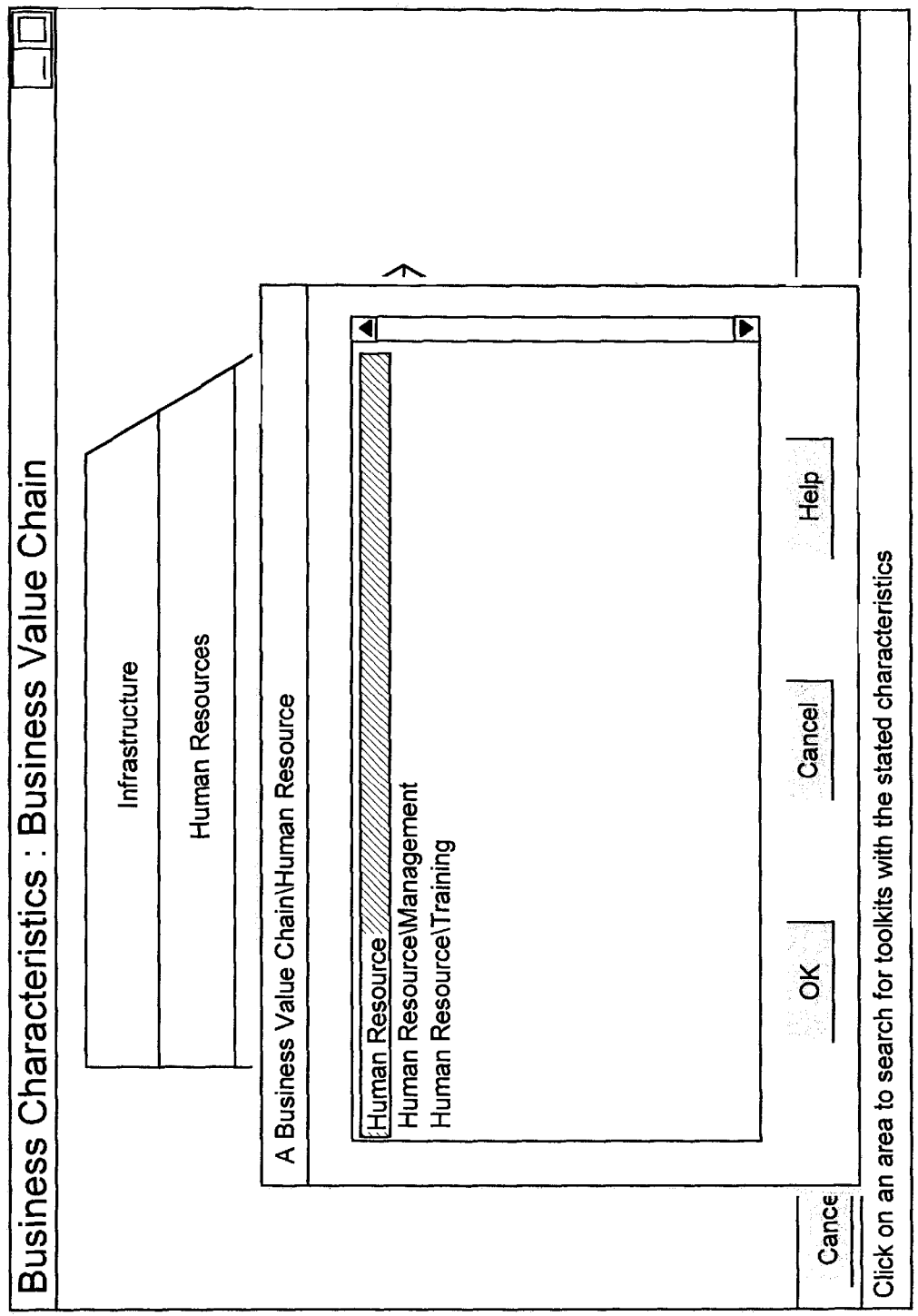

Referring again to FIG. 4, if the user selects "human resources", system 50 will display the screen of FIG. 6 which illustrates two examples of human resources: management and training. After the user makes a selection from the screen of FIG. 6, system 50 will display a subset list of the predefined solutions classified (or "tagged) as the selected human resource. Then, the selection process continues as described below in relation to FIGS. 20–25.

Figure 7:
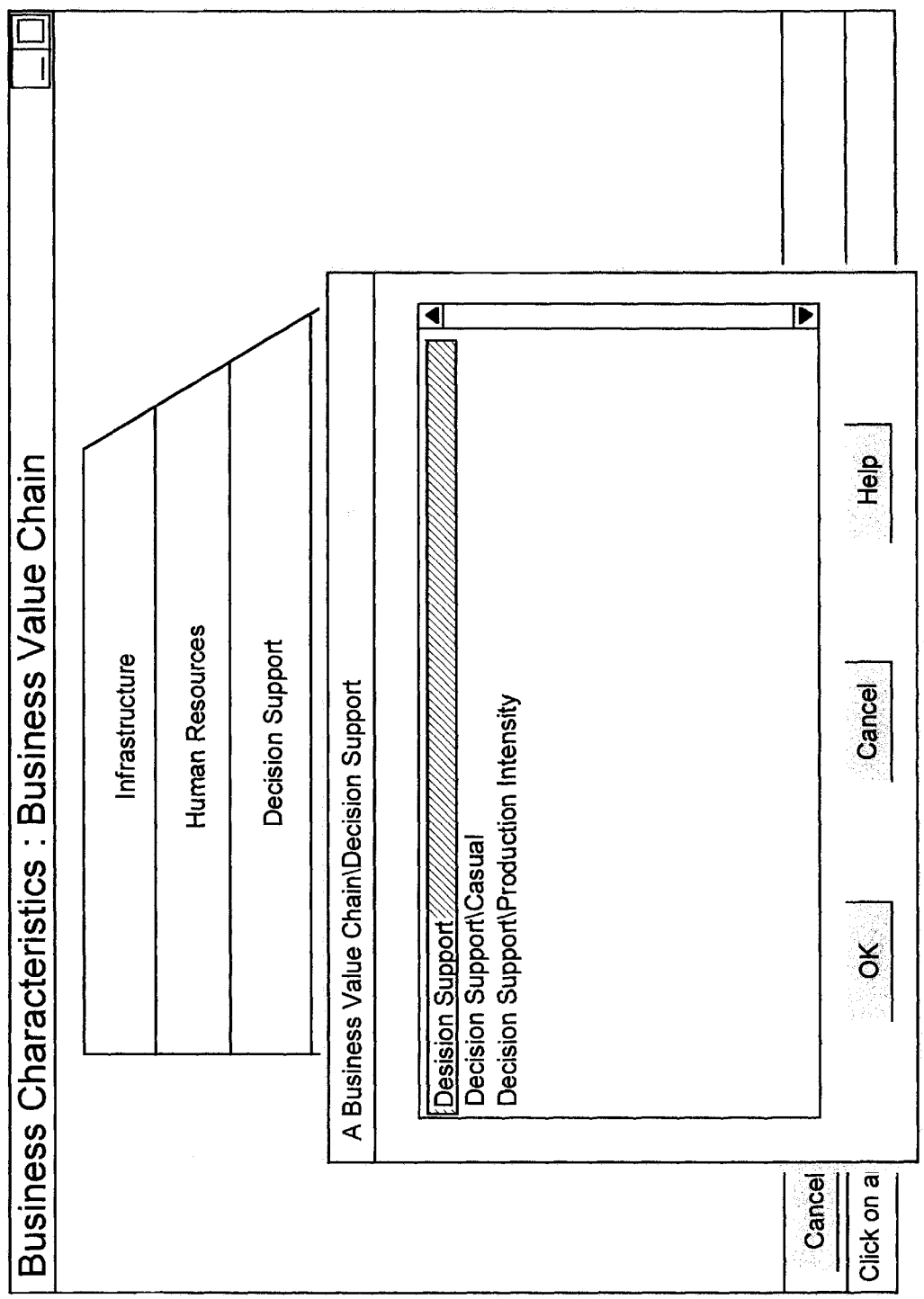

Referring again to FIG. 4, if the user selects "decision support", system 50 will display the screen of FIG. 7 which illustrates two examples of decision support: casual and production intensity. After the user makes a selection from the screen of FIG. 7, system 50 will display a subset list of the predefined solutions classified (or "tagged) as the selected decision support. Then, the selection process continues as described below in relation to FIGS. 20–25.

Figure 8:
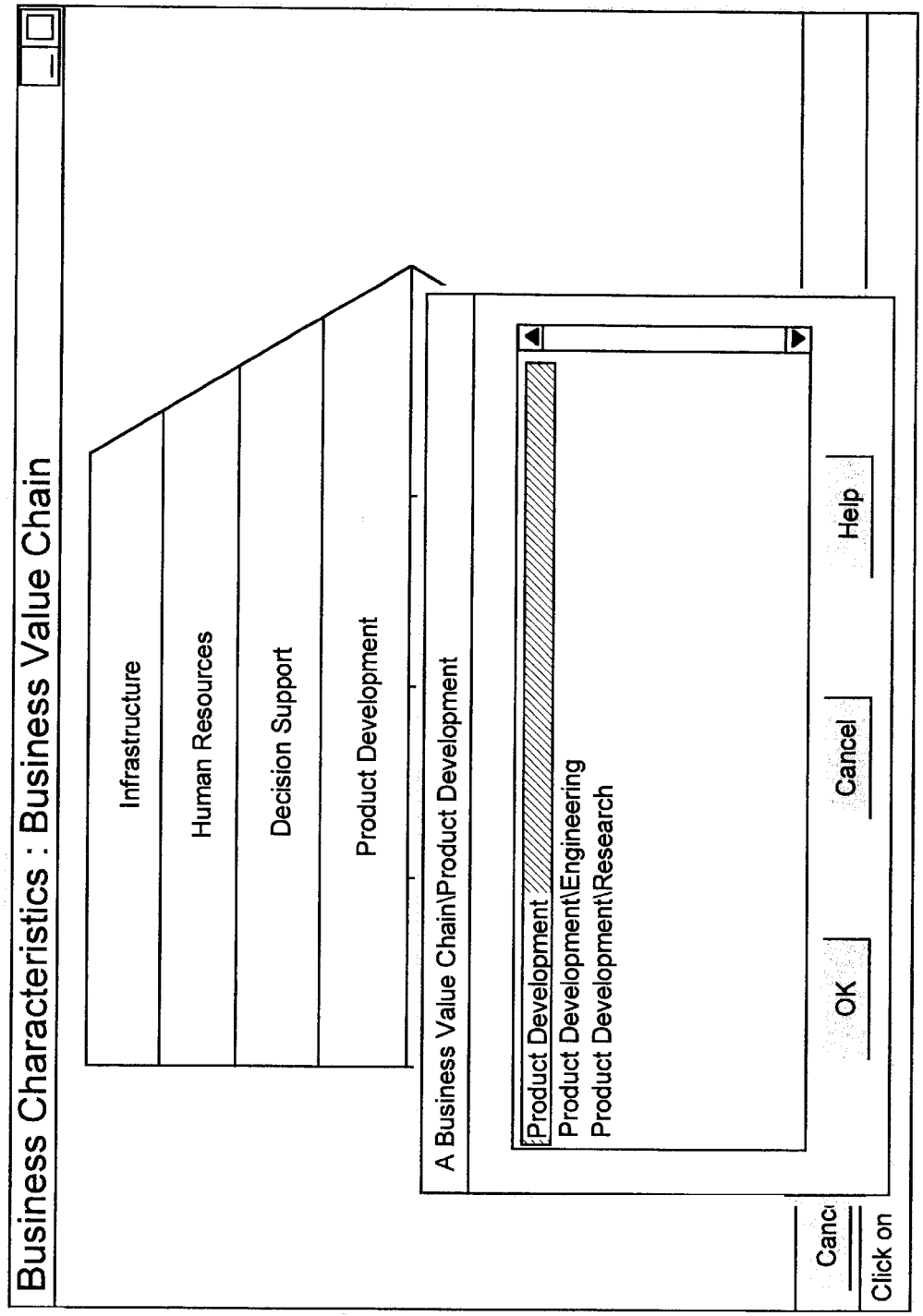

Referring again to FIG. 4, if the user selects "product development", system 50 will display the screen of FIG. 8 which illustrates two examples of product development: engineering and research. After the user makes a selection from the screen of FIG. 8, system 50 will display a subset list of the predefined solutions classified (or "tagged") as the selected product development. Then, the selection process continues as described below in relation to FIGS. 20–24.

Figure 9:
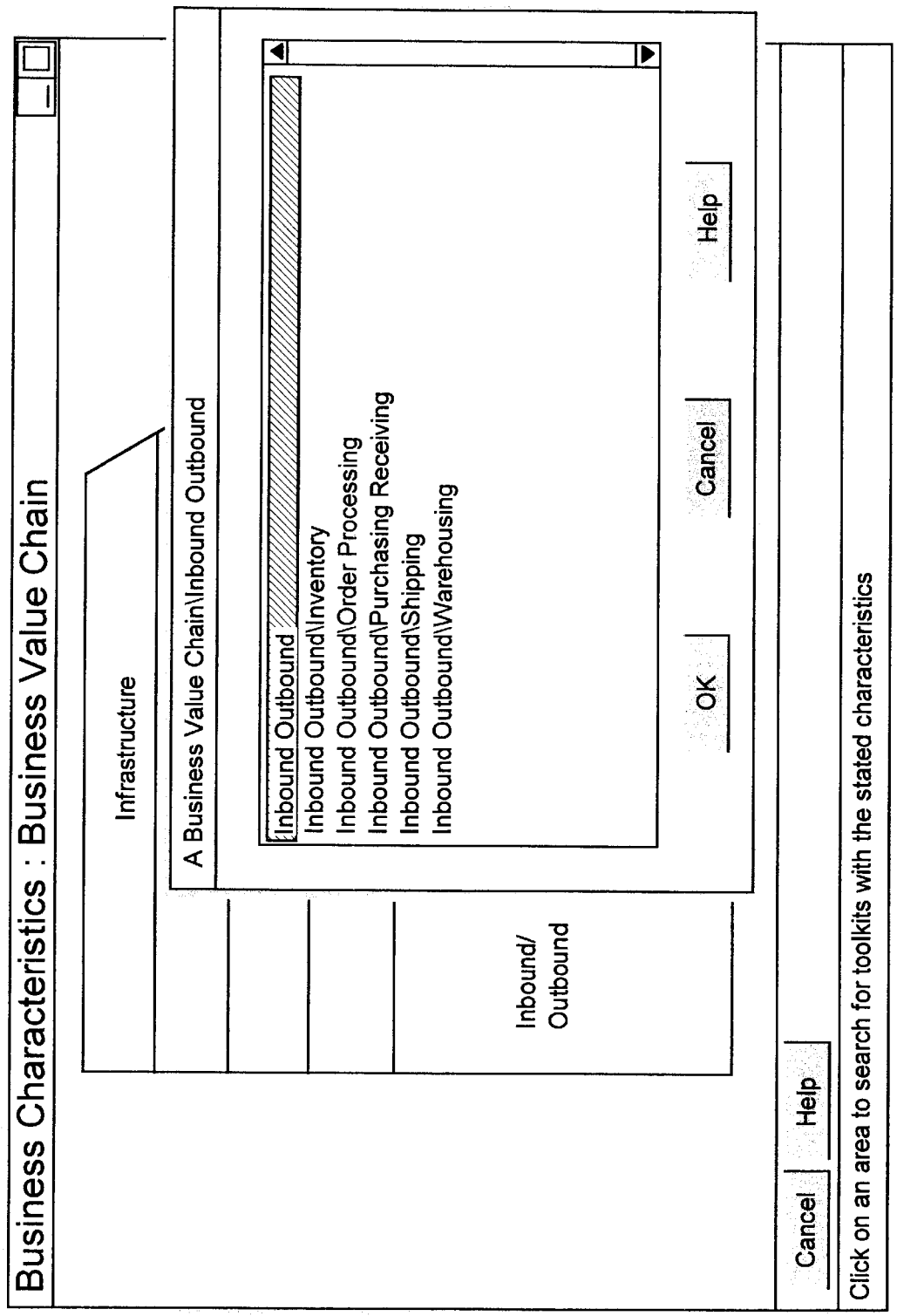

Referring again to FIG. 4, if the user selects "inbound outbound", system 50 will display the screen of FIG. 9 which illustrates five examples of inbound outbound: inventory, order processing, purchasing receiving, shipping and warehousing. After the user makes a selection from the screen of FIG. 9, system 50 will display a subset list of the predefined solutions categorized (or "tagged) as by the selected inbound outbound. Then, the selection process continues as described below in relation to FIGS. 20–25.

Figure 10:
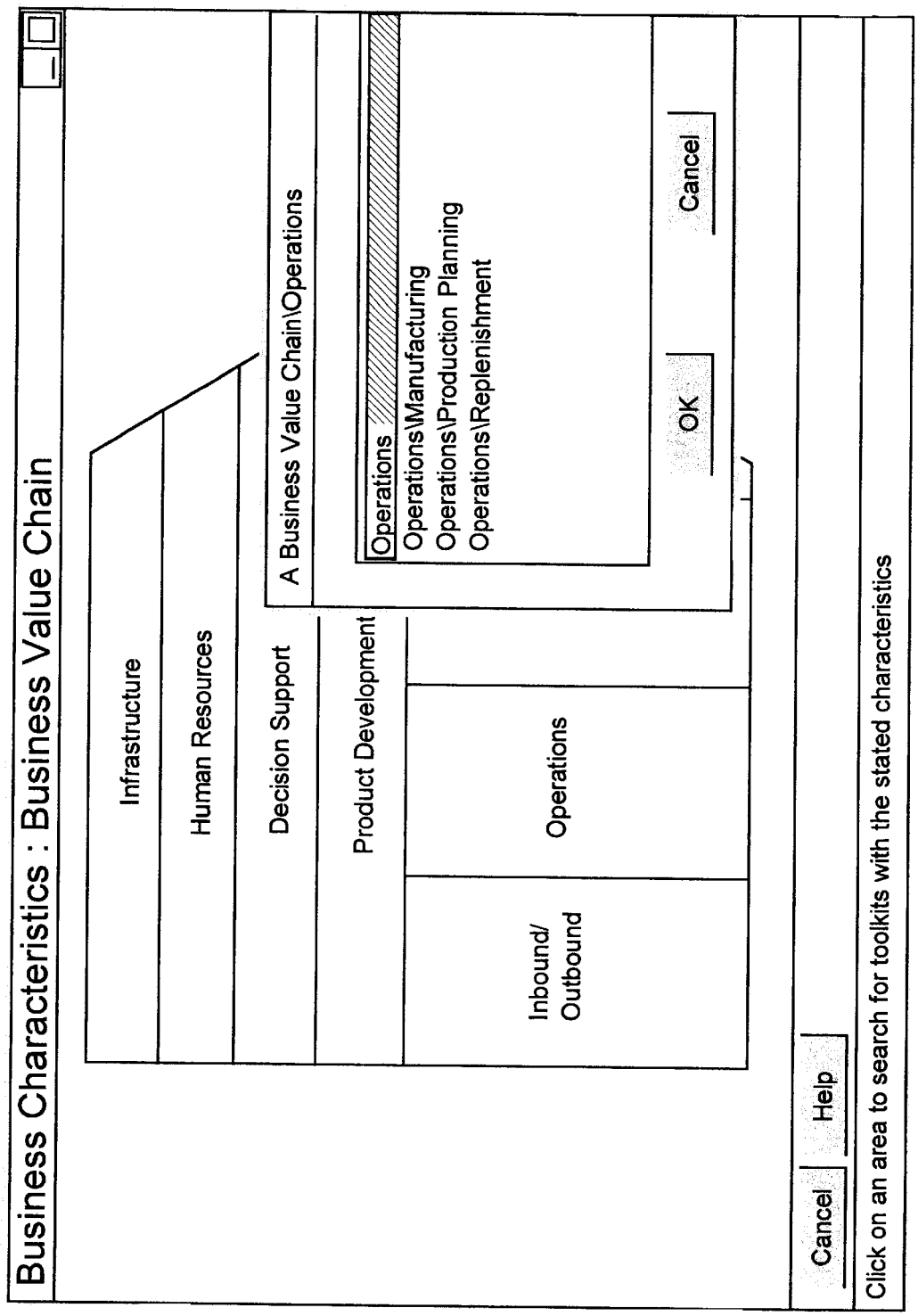

Referring again to FIG. 4, if the user selects "operations", system 50 will display the screen of FIG. 10 which illustrates three examples of operations: manufacturing, production planning and replenishment. After the user makes a selection from the screen of FIG. 10, system 50 will display a subset list of the predefined solutions classified (or "tagged) as the selected operations. Then, the selection process continues as described below in relation to FIGS. 20–25.

Figure 11:
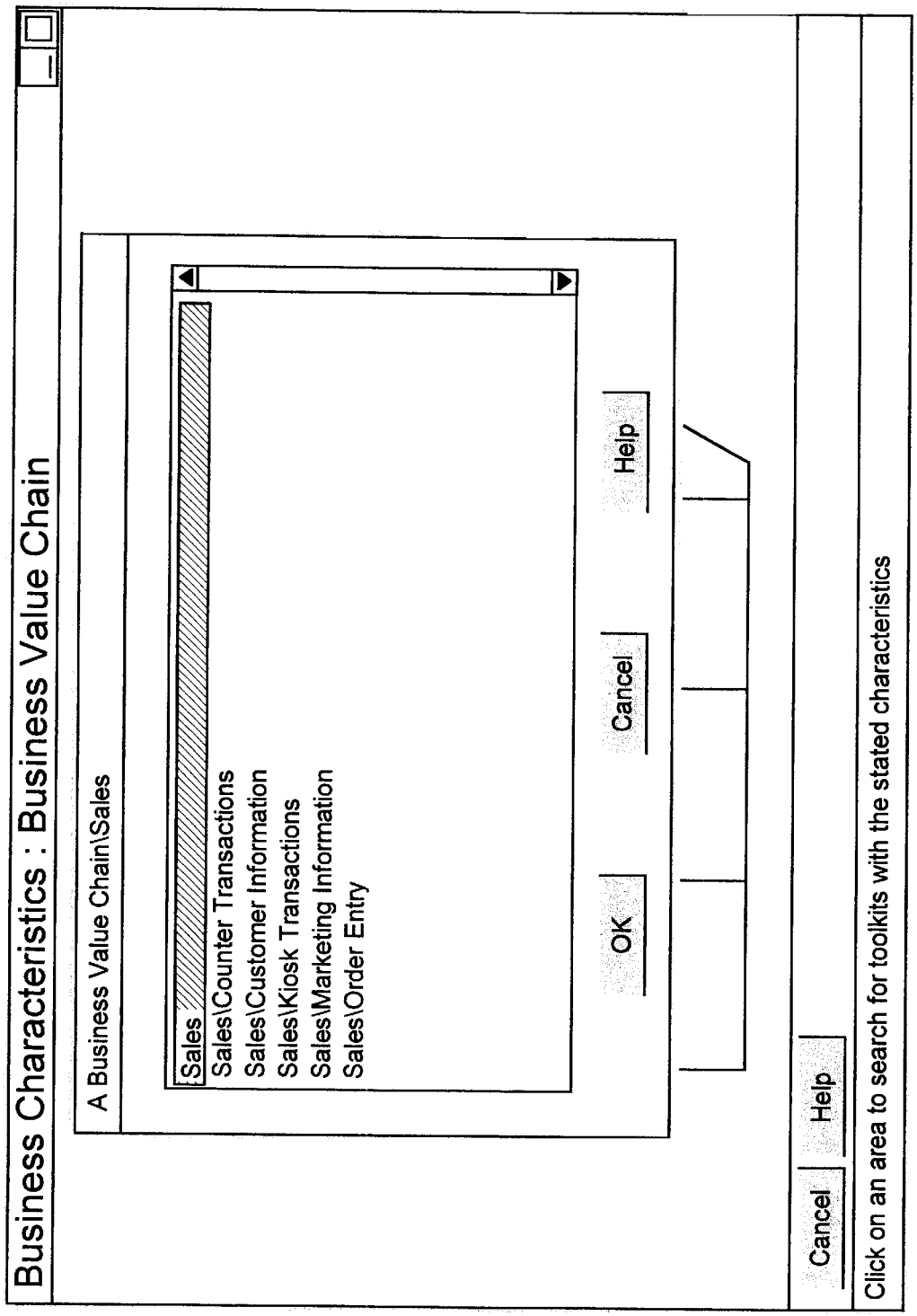

Referring again to FIG. 4, if the user selects "sales", system 50 will display the screen of FIG. 11 which illustrates five examples of operations: counter transactions, customer information, kiosk transactions, marketing information, order entry. After the user makes a selection from the screen of FIG. 11, system 50 will display a subset list of the predefined solutions classified (or "tagged) as the selected type of sales. Then, the selection process continues as described below in relation to FIGS. 20–25.

Figure 12:
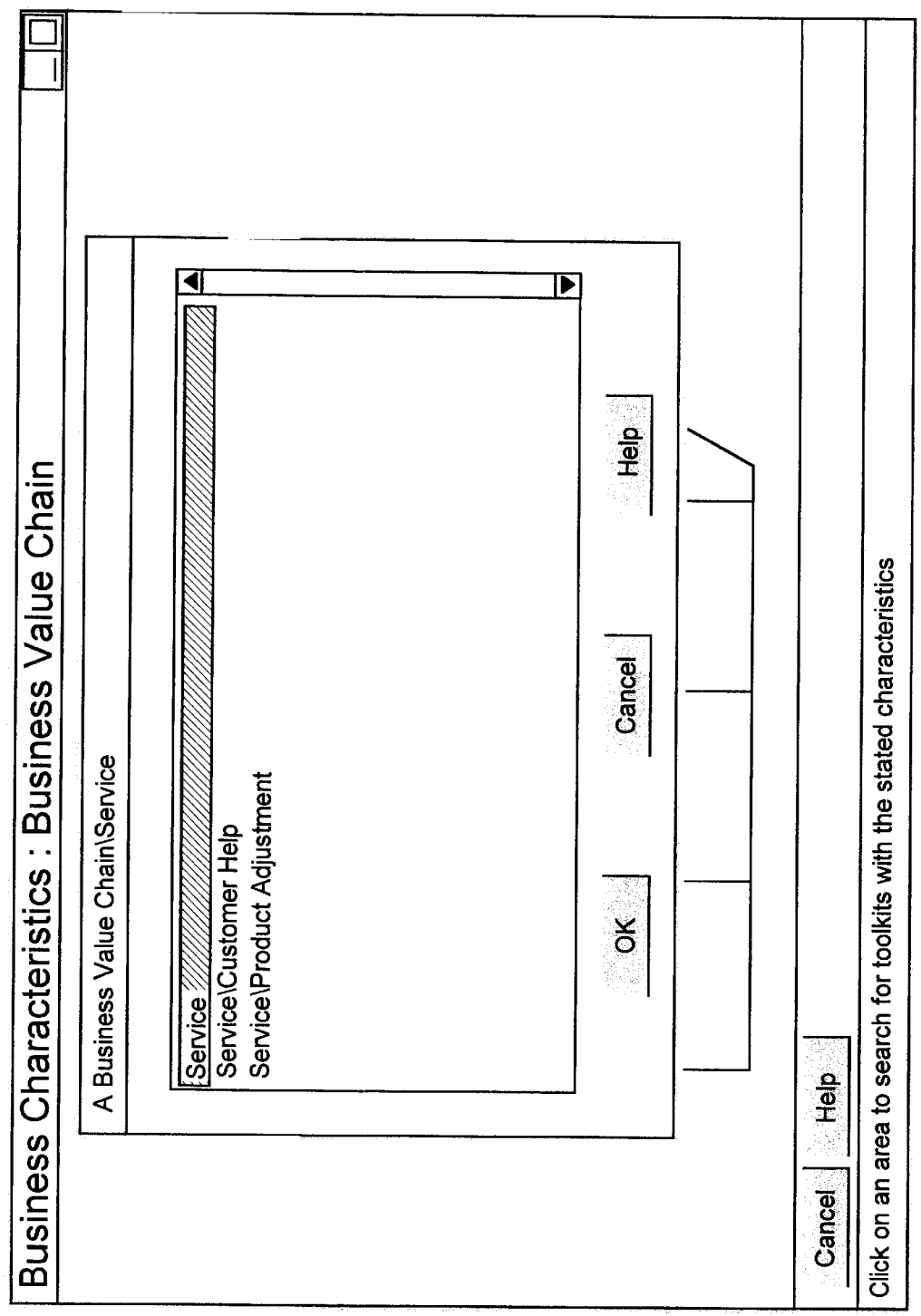

Referring again to FIG. 4, if the user selects "service", system 50 will display the screen of FIG. 12 which illustrates two examples of service: customer help and product adjustment. After the user makes a selection from the screen of FIG. 12, system 50 will display a subset list of the predefined solutions classified (or "tagged) as the selected type of service. Then, the selection process continues as described below in relation to FIGS. 20–25.

Figure 13:
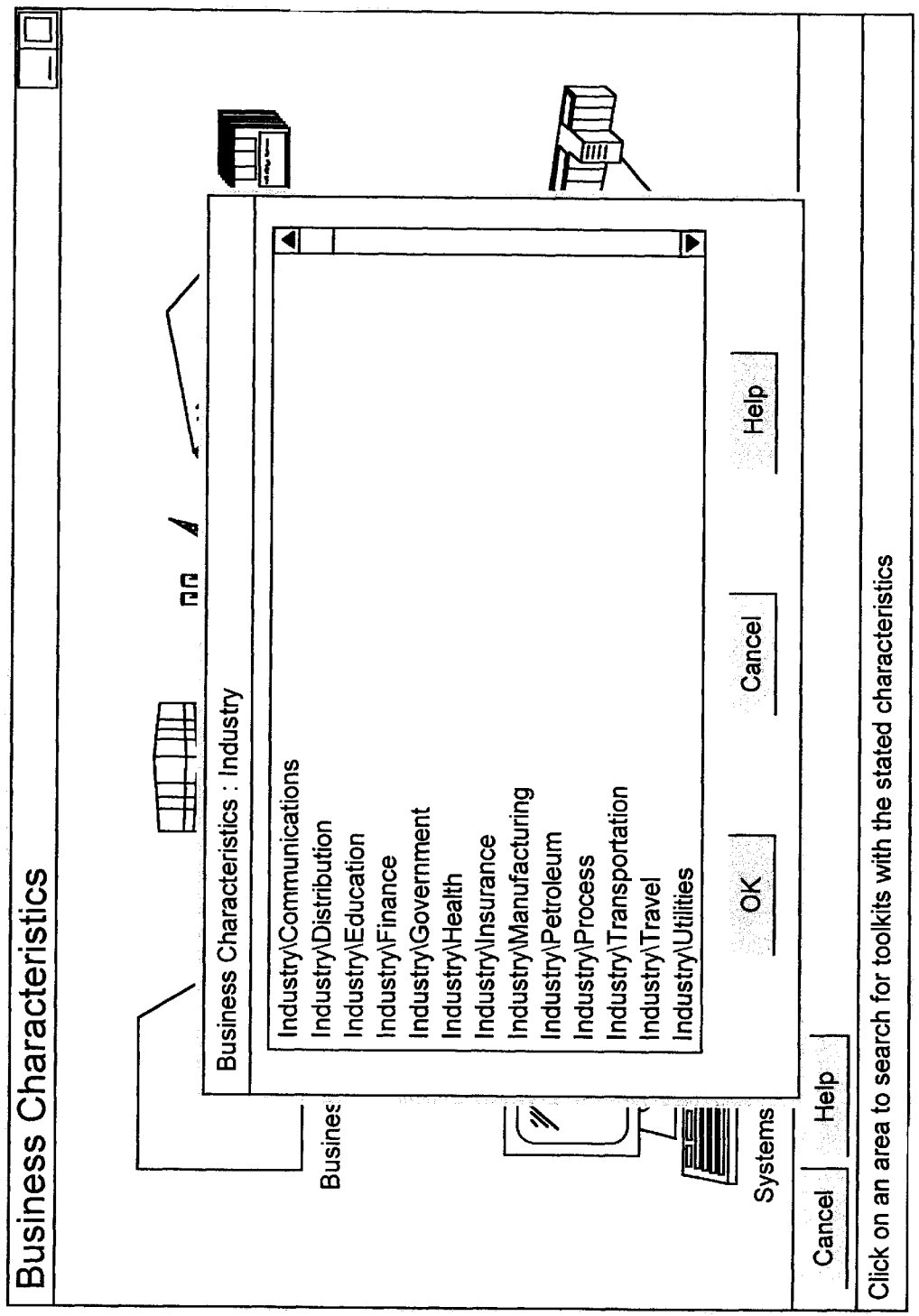

Referring again to FIG. 3, if the user selects "industry", system 50 will display the screen of FIG. 13 which illustrates thirteen examples of industries: communications, distribution, education, finance, government, health, insurance, manufacturing, petroleum, process, transportation and travel utilities. After the user makes a selection from the screen of FIG. 13, system 50 will display a subset list of the predefined solutions classified (or "tagged) as the selected type of industry. Then, the selection process continues as described below in relation to FIGS. 20–24.

Figure 14:
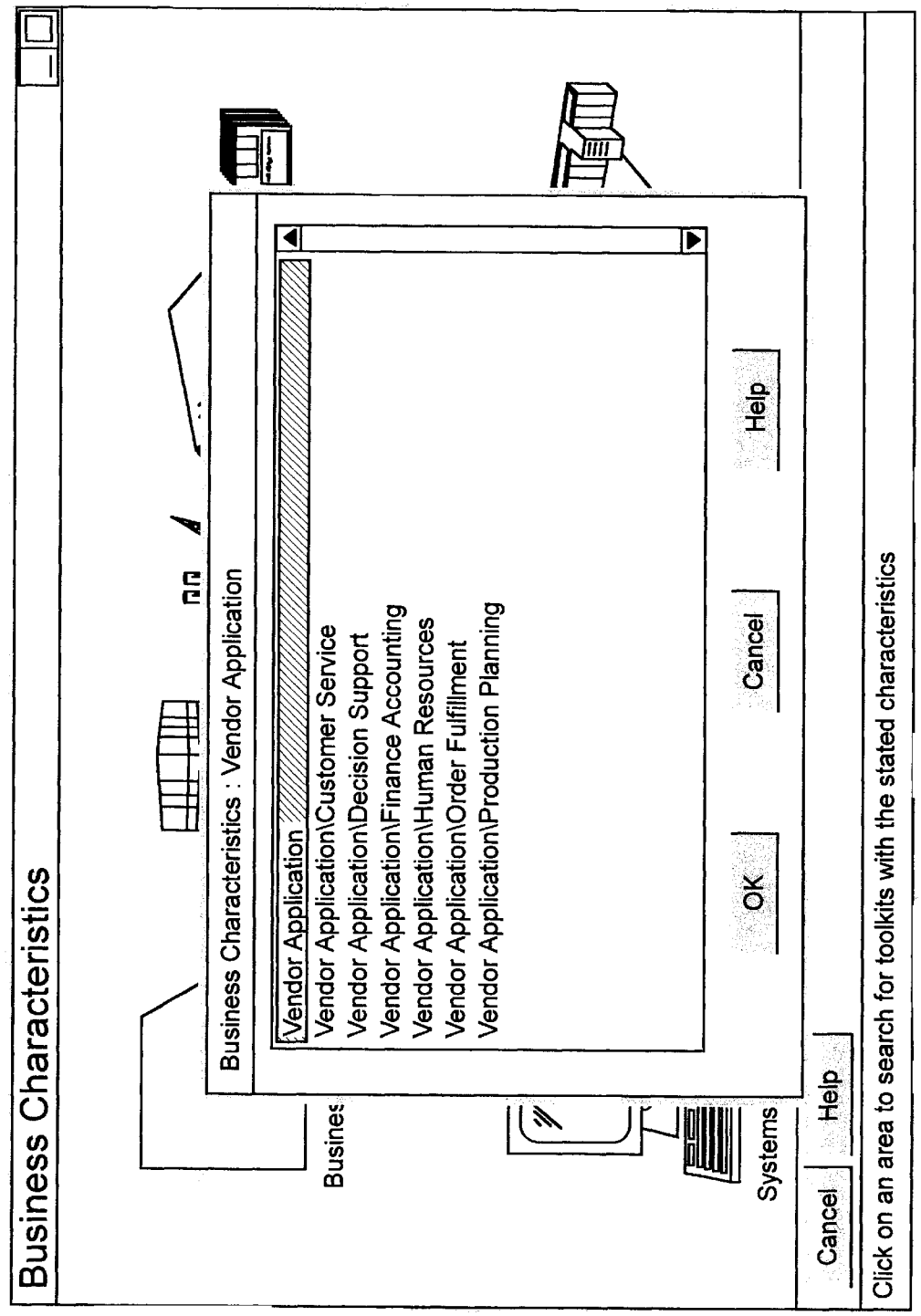

Referring again to FIG. 3, if the user selects "vendor application", system 50 will display the screen of FIG. 14 which illustrates six examples of vendor applications: customer service, decision support, finance accounting, human resources, order fulfillment and production planning. After the user makes a selection from the screen of FIG. 14, system 50 will display a subset list of the predefined solutions classified (or "tagged) as the selected type of vendor application. Then, the selection process continues as described below in relation to FIGS. 20–25.

Figure 15:
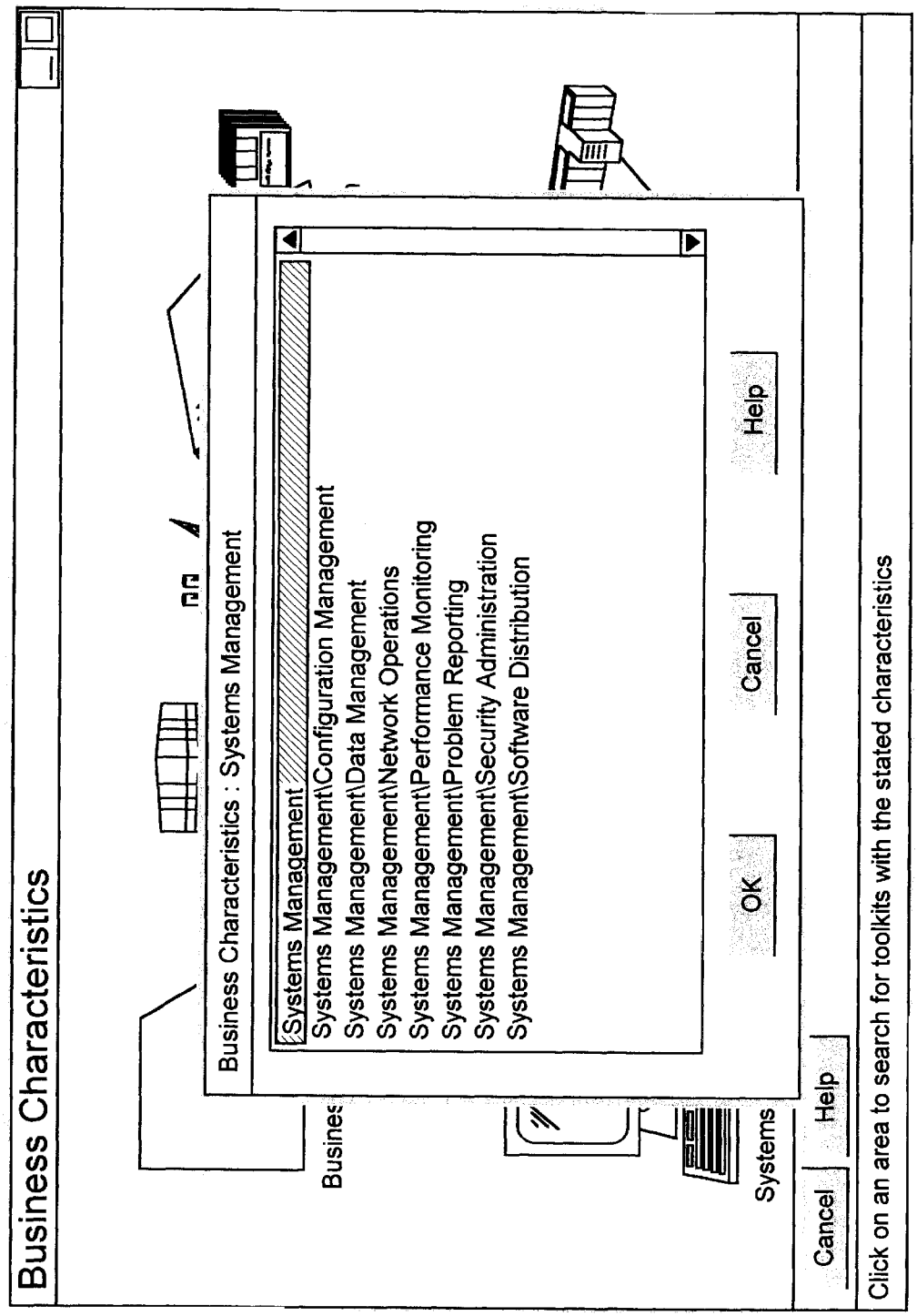

Referring again to FIG. 3, if the user selects "systems management", system 50 will display the screen of FIG. 15 which illustrates seven examples of systems management: configuration management, data management, network operations, performance monitoring, problem reporting, security administration and software distribution. After the user makes a selection from the screen of FIG. 15, system 50 will display a subset list of the predefined solutions classified (or "tagged) as the selected type of systems management. Then, the selection process continues as described below in relation to FIGS. 20–25.

Figure 16:
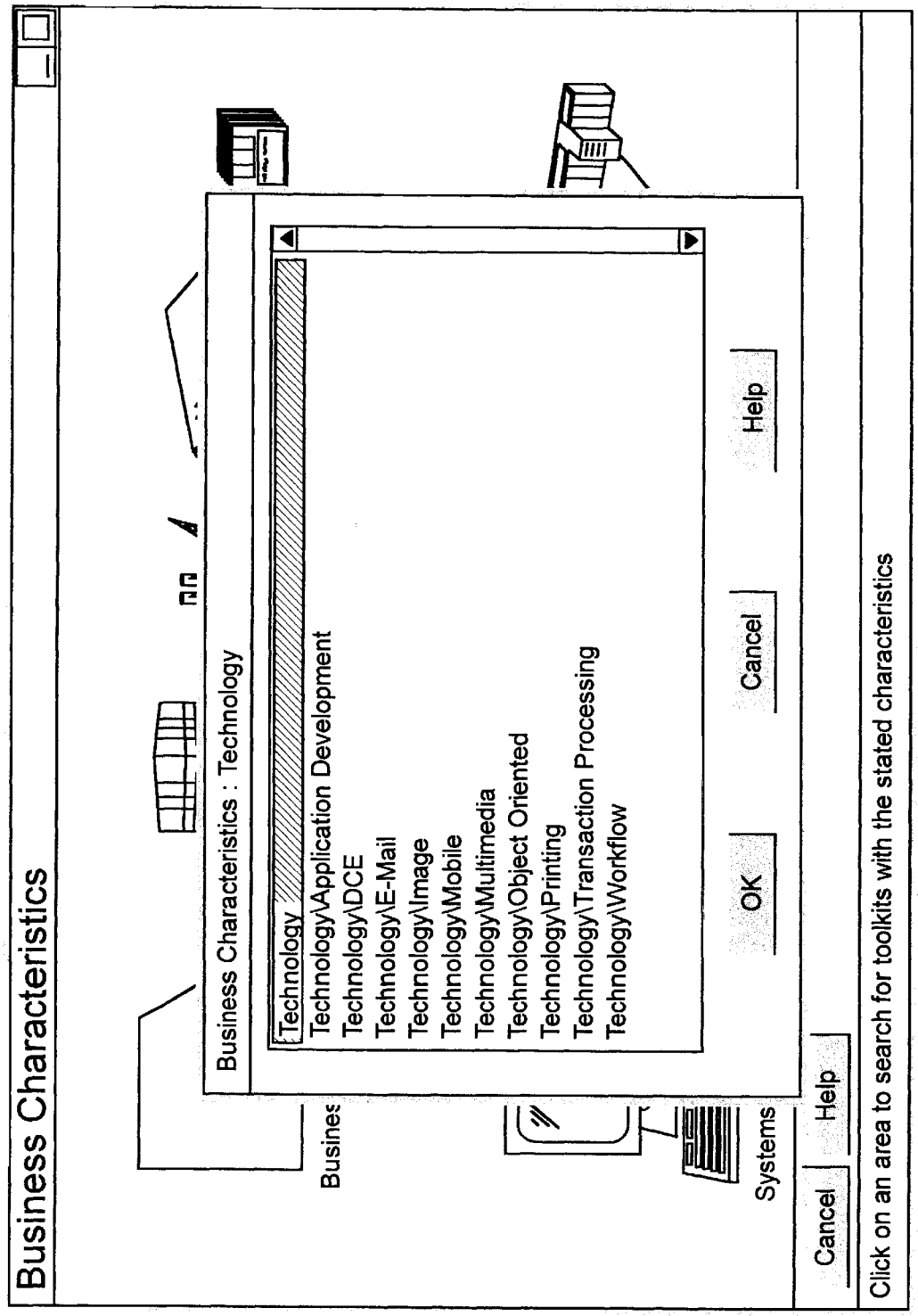

Referring again to FIG. 3, if the user selects "technology", system 50 will display the screen of FIG. 16 which illustrates seven examples of technology: application development, DCE, E-Mail, image, mobile multimedia, object oriented, printing, transaction processing and workflow. After the user makes a selection from the screen of FIG. 16, system 50 will display a subset list of the predefined solutions classified (or "tagged) as the selected type of technology. Then, the selection process continues as described below in relation to FIGS. 20–25.

Figure 17:
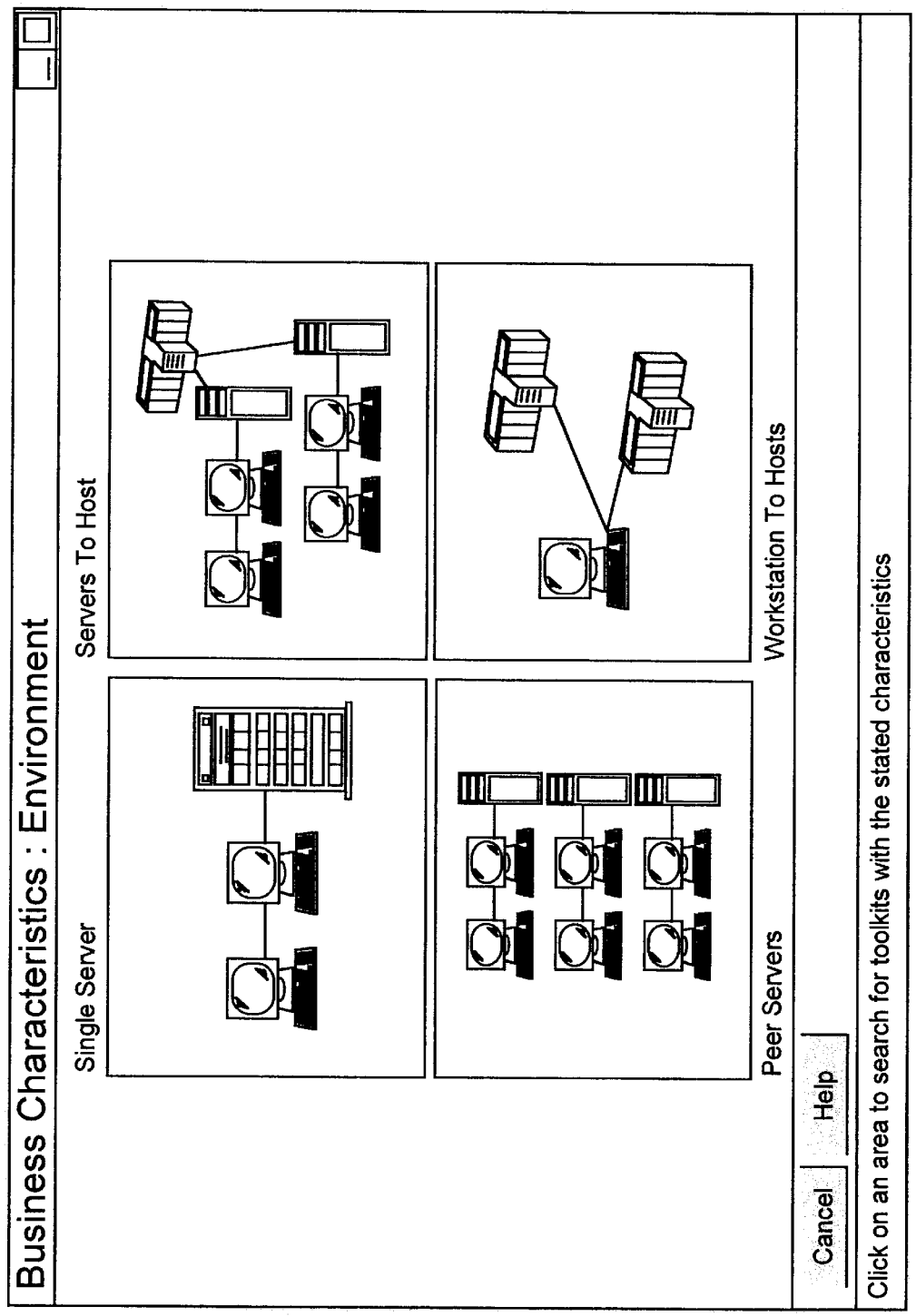

Referring again to FIG. 3, if the user selects "environment", system 50 will display the screen of FIG. 17 which illustrates four examples of environment: single server, servers to host, peer servers and workstation to hosts. After the user makes a selection from the screen of FIG. 17, system 50 will display a subset list of the predefined solutions classified (or "tagged) as the selected type of environment. Then, the selection process continues as described below in relation to FIGS. 20–25.

Figure 18:
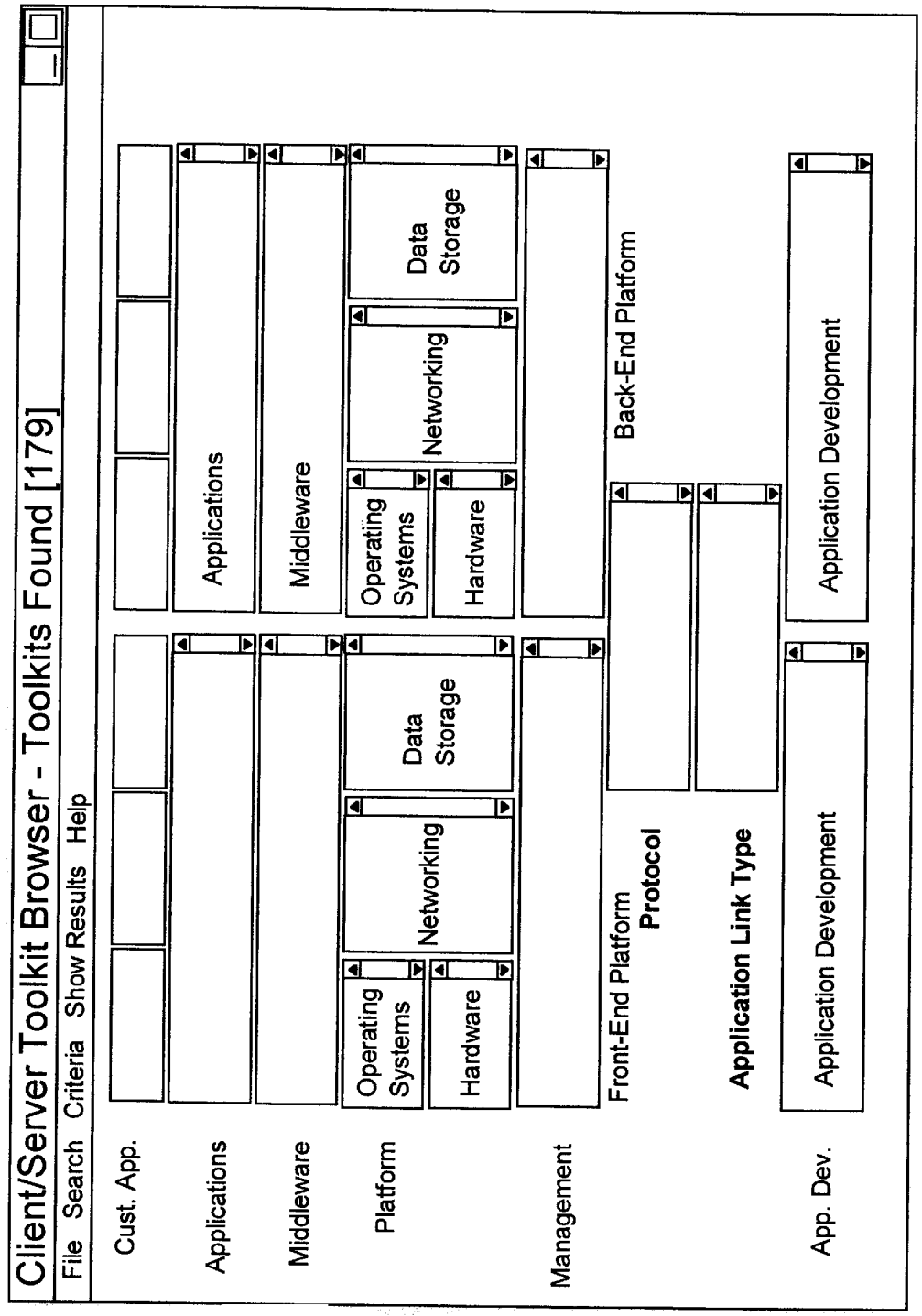

Referring again to FIG. 2, if the user selects "products, protocols and links", system 50 will display the screen of FIG. 18 which illustrates a front end platform 200 and associated software, a back end platform 202 and associated software, and protocols and links 204 between the front end platform and back end platform. Then the user can request to see a list of types or brands of any of the illustrated blocks and then a solution based on a selected one of the types or brands, as follows. If the user selects the operating system box of the back end platform 202, system 50 will display a "specify operating system" option (not shown) on the screen of FIG. 18. If the user selects the "specify operating system" option, system 50 will display the screen of FIG. 19 which lists types or brands of operating systems, thirteen of which are shown: AIX/6000, ConvexOS, DC/OSx, DG-UX, DOS, DOS/VSE, HP-UX, IRIX, MVS/ESA, NEC Unix, NetWare, OS/2 and OS/2 for SMP. If the user selects any of the operating systems from the screen of FIG. 19, then system 50 will display a subset list of the predefined solutions classified (or "tagged) as the selected type of back end operating system.

Figure 20:
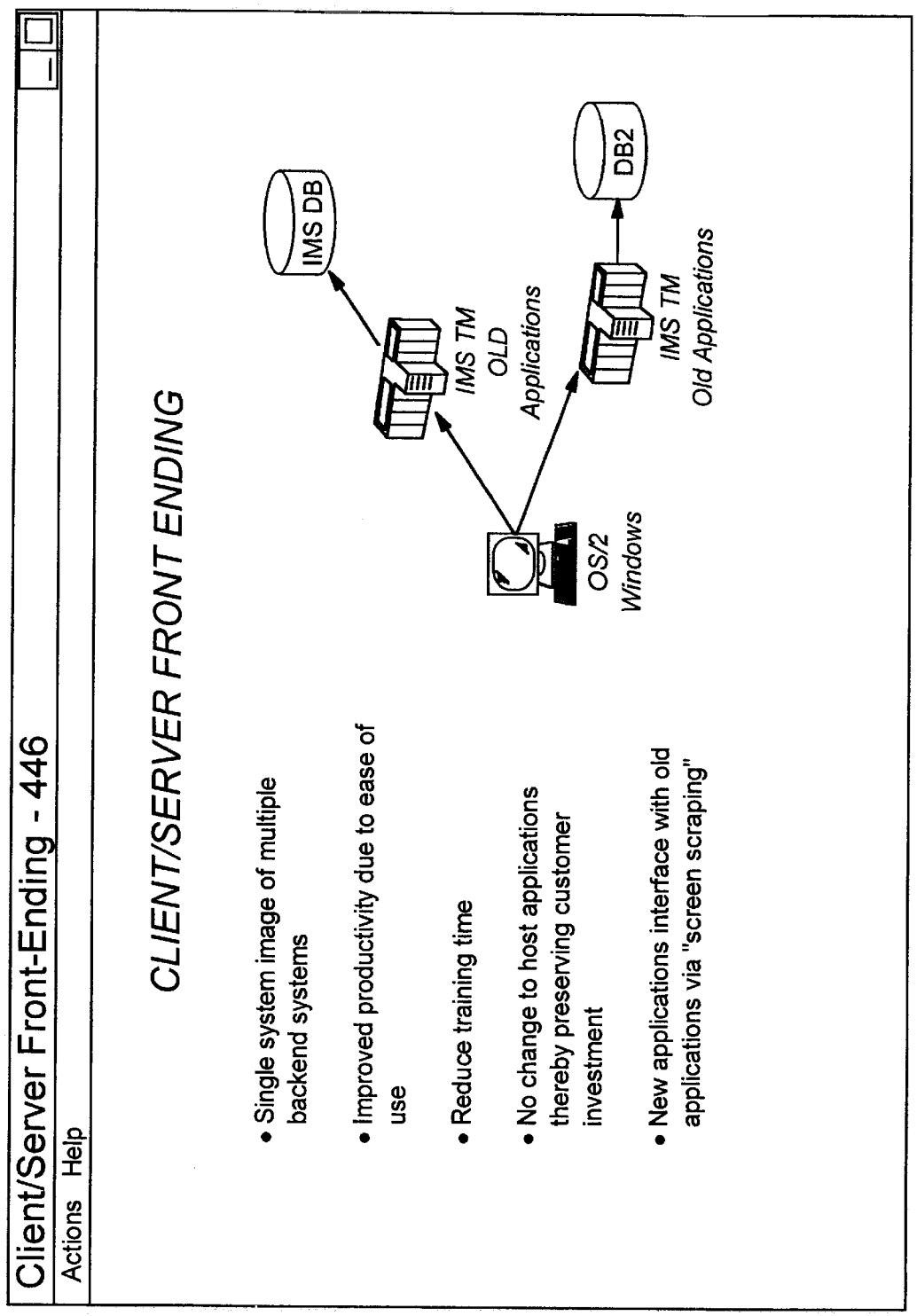

One of the solution kits in the subset list is "Client/Server Front-Ending, and if selected, system 50 will display the screen of FIG. 20 which graphically illustrates an image of the client/server front-ending solution kit with a text description. The user can then request that the graphical illustration of FIG. 20 be transformed into the graphical block diagram of FIG. 21 which includes additional information about components within the solution kit.

Figure 21:
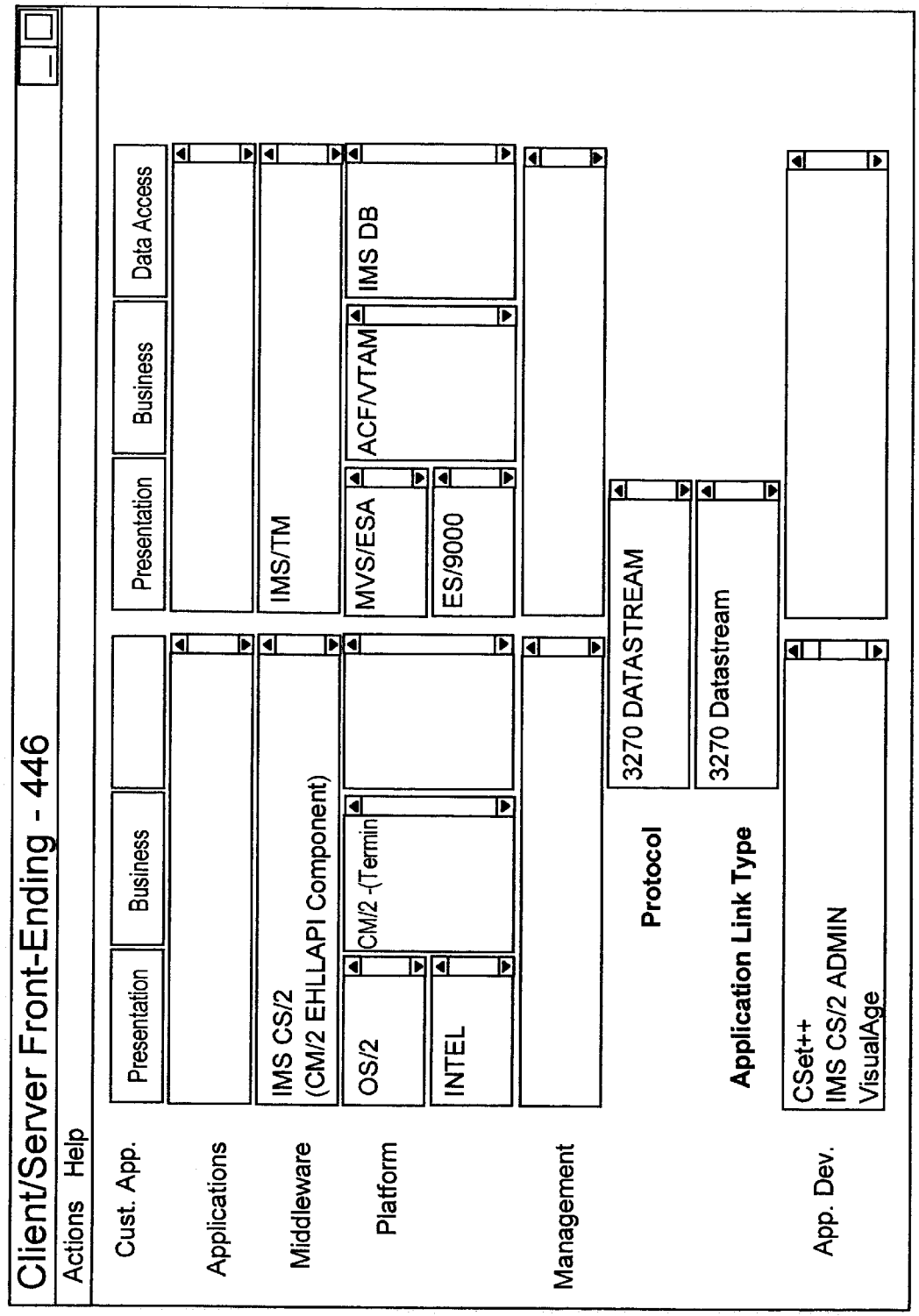

In FIG. 21, one of the components "IMS DB" of the block diagram is highlighted. The highlighting indicates that there exists an alternate component that can substitute for the highlighted component and still provide a proven solution. If the user selects the highlighted component, system 50 will display the screen of FIG. 22 with a pull-down menu listing name, abstract, alternate products and data storage type. If the user selects "alternate products", then system 50 will display a list of the alternate products, for example, DB2. If the user selects the DB2 alternate product from the list, then system 50 will display the screen of FIG. 23 which is the same as that of FIG. 21 except FIG. 23 includes the acronym for the alternate product instead of the acronym for the product which it replaced.

Figure 22:
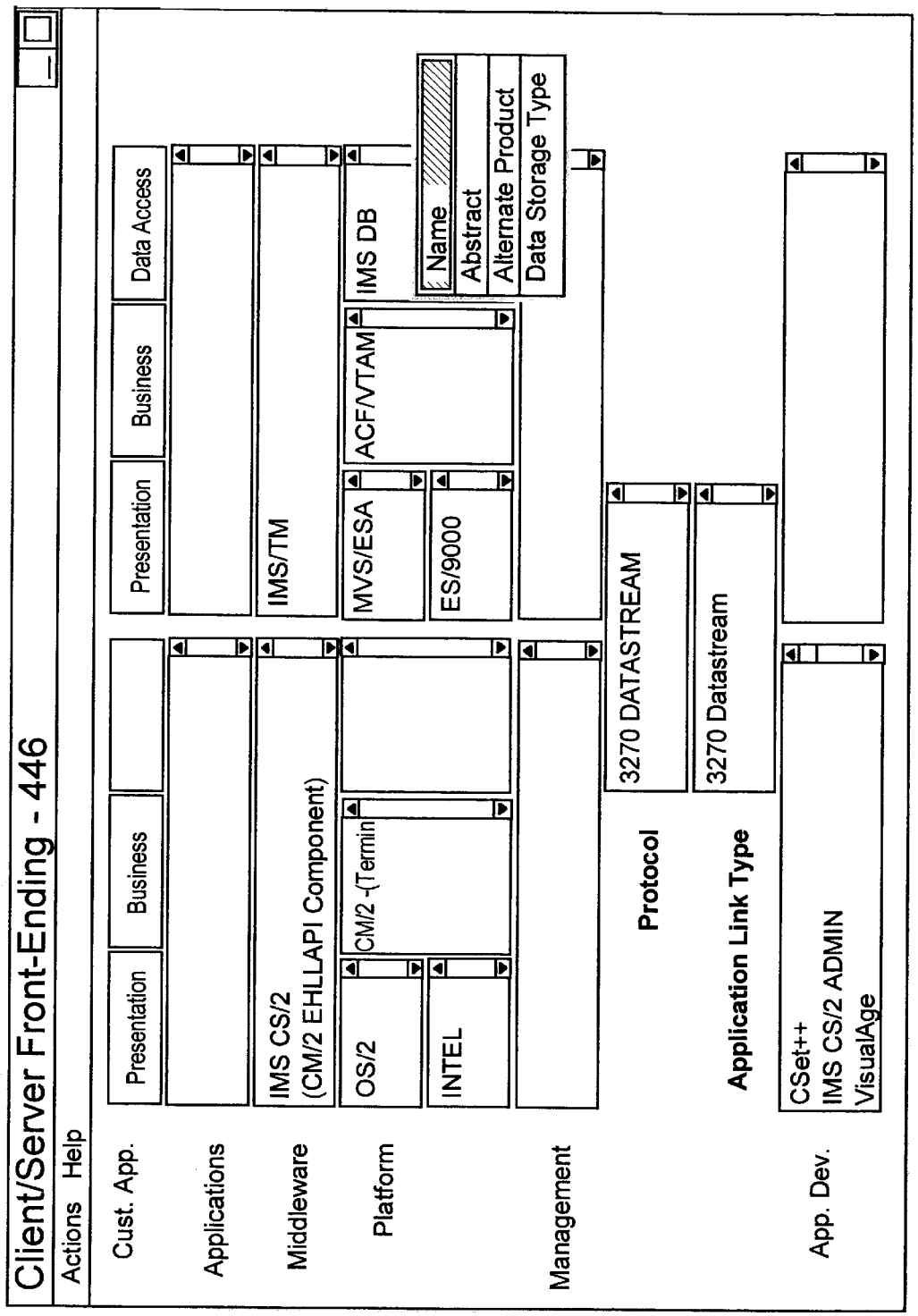
Figure 23:
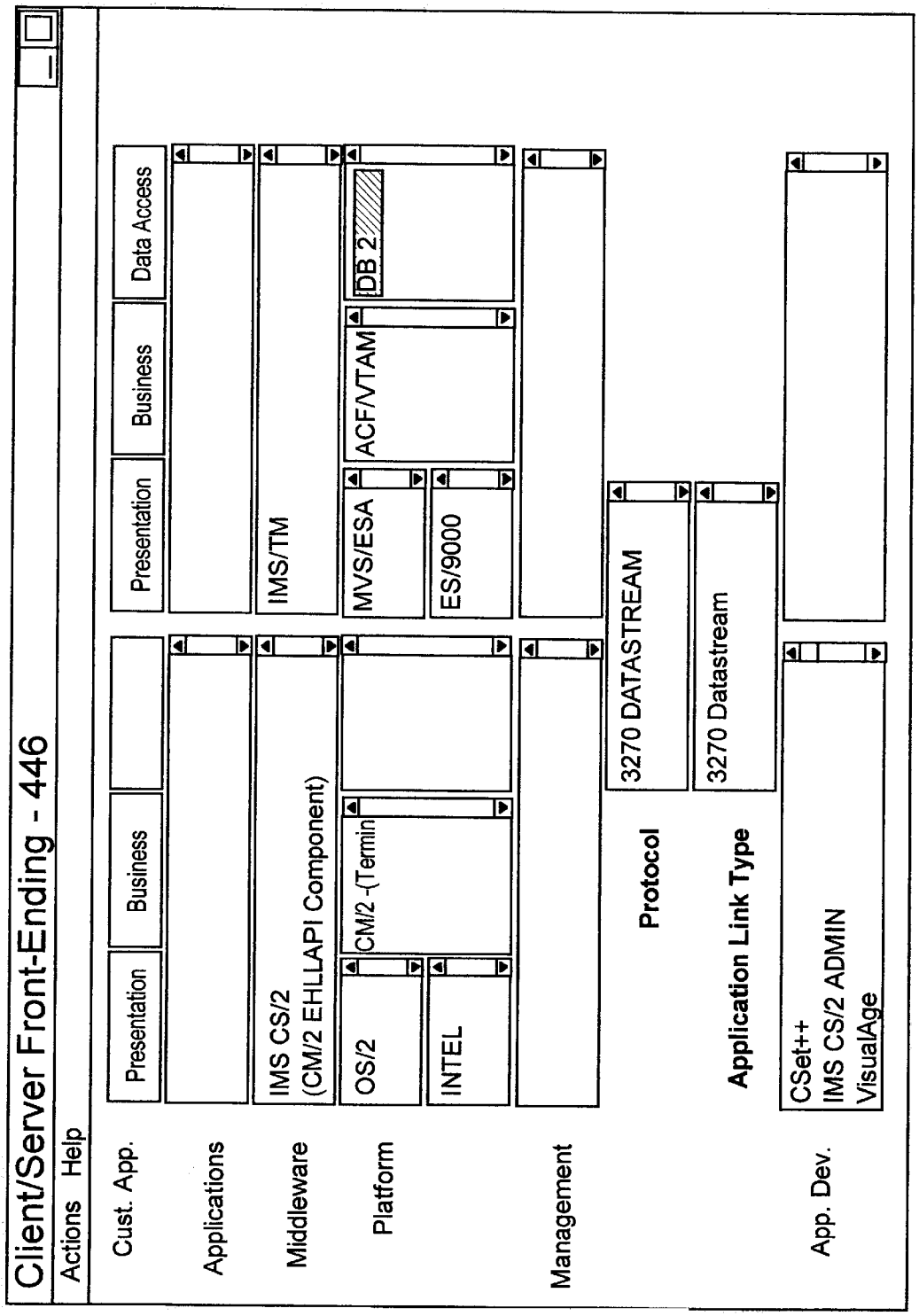
Figure 24:
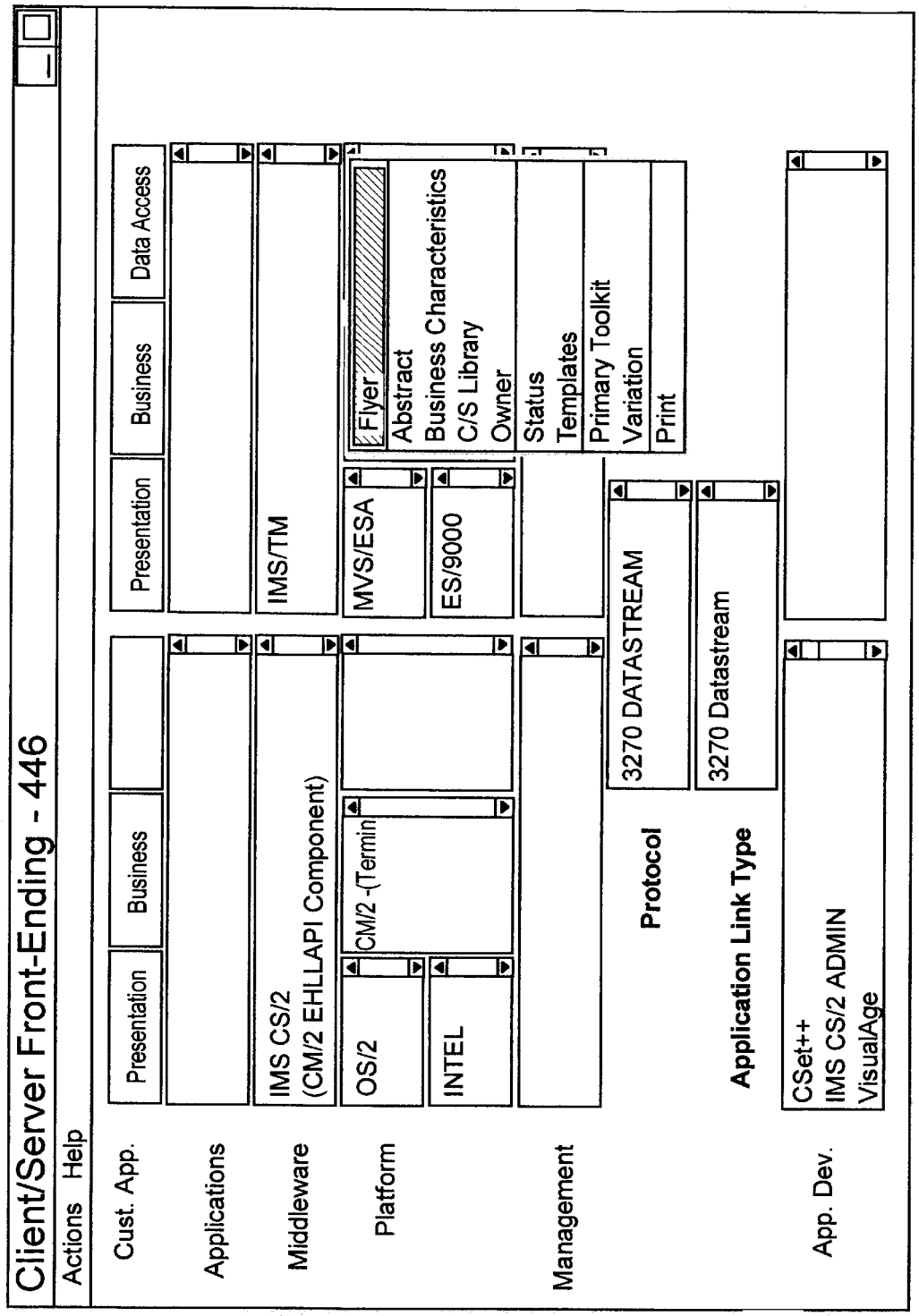

The user can now request a list of options by selecting "Actions" from the menu bar on FIG. 21, and in response, system 50 will display a pull down menu as illustrated in FIG. 24, indicating that there is one possible "variation" to the block design of FIG. 22 (other than the replacement of DB2 for IMS DB which is considered an "alternate" design). A "variation" unlike an "alternate" design requires a change to more than one component to provide compatibility within the solution. If the user then selects the "variation—1" option from the pull down menu, system 50 will display the screen of FIG. 24 which is the same as that of FIG. 21 except for changes in the front end platform—DOS Windows instead of OS/2, PC/3270 instead of CM/2-Terminal (to support DOS instead of OS/2) and IMS CS for Windows (PC/3270 HLLAPI Component) instead of IMS CS/2 (CM/2 EHLLAPI Component) (to support DOS instead of OS/2). The back end platform also includes IMS DB which resulted from the earlier selection from the screen of FIG. 19.

Referring again to FIG. 24, if the user selects "Abstract", system 50 will display an abstract corresponding to the previously selected solution kit.

Data Structures

Figure 26:
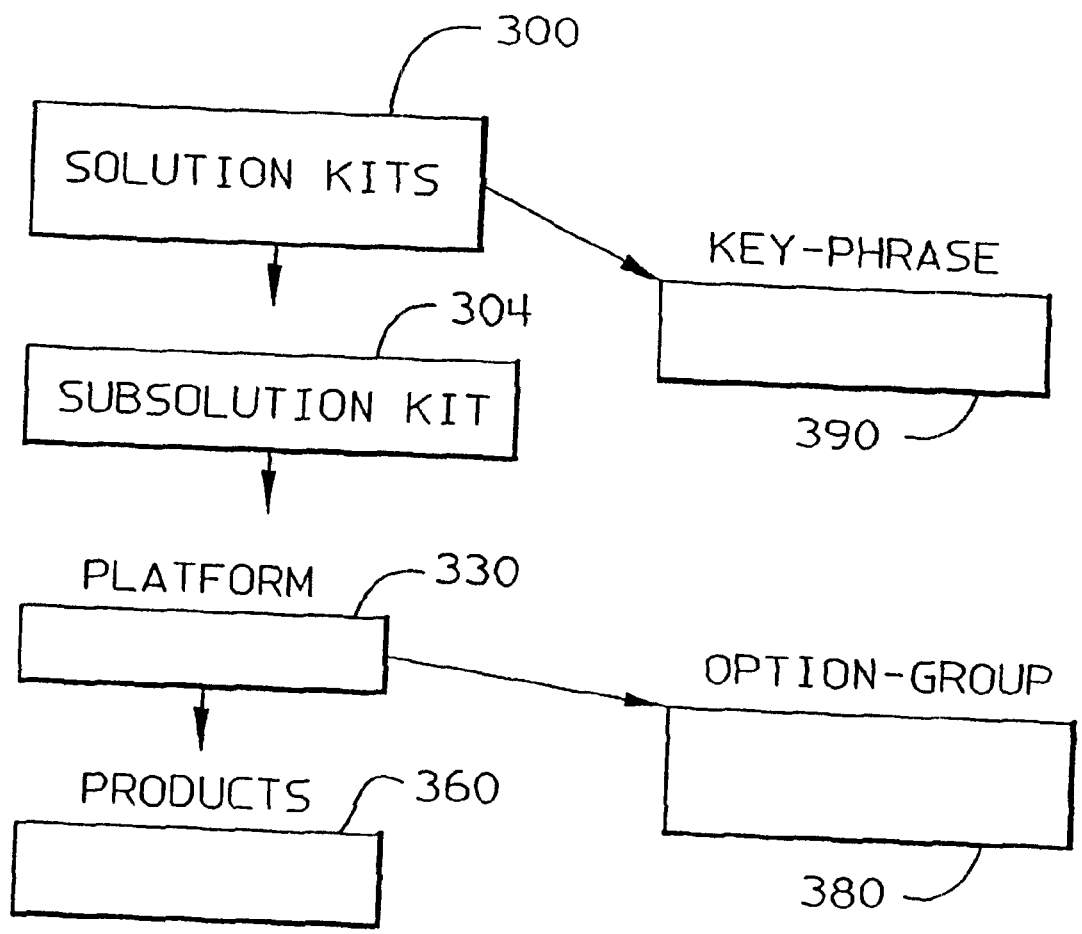
FIG. 26 illustrates data structures stored within the expert system of FIG. 1.

FIG. 26 illustrates the data structures accompanying program 52 which store information defining the predefined solution kits. These data structures take the form of tables in a relational data base and are searched by program 52 to provide the search criteria, subset lists, solution kits, alternatives and variations described above.

A table 300 of solution kits lists an identification, name, abstract and submitter name for each predefined solution kit. The following is an example of table 300:

| SOLUTIONKIT TABLE | | | |
|---|---|---|---|
| Solutionkit ID | Solutionkit Name | Abstract | Owner Name |
| 1 | IMS Front Ending | This solutionkit | John Smith |
| . | . | . | . |
| . | . | . | . |
| . | . | . | . |

The identifications within table 300 are used for internal purposes only and are not presented to the user. Instead, the user is presented with the name entry which is a descriptive name of the solution kit. These names were provided as described above in subset lists after selections from screens of FIGS. 5–17 and 19. The abstracts were provided as described above pursuant to the "Abstract" selection from the screen of FIG. 24, and comprises text describing the business problem being solved by the solution kit, the general solution, the role of key components of the solution kit, and other information helpful to the user. The owner name is the name of the person who defined and submitted the solution kit pursuant to the "owner" selection from the screen of FIG. 24, and indicates a person from whom to obtain further information pertaining to the solution kit.

A table 304 of "subsolution" kits lists in respective rows, predefined variations (by subsolution kit ID) of a solution kit as described above in reference to FIGS. 21 and 25 (two variations), and specific platforms, protocols and links of each solution kit variation. The following is an example of table 304:

| SUB_SOLUTIONKIT TABLE | | | | | |
|---|---|---|---|---|---|
| Solutionkit ID | Sub Solutionkit ID | Answr Platform1 ID | Protocol12 ID | Link Type12 ID | Answr Platform2 ID |
| 1 | 1 | 1 | 1 | 1 | 2 |
| 1 | 2 | 3 | 1 | 1 | 2 |
| . | . | . | . | . | . |
| . | . | . | . | . | . |
| . | . | . | . | . | . |

This example includes the subsolution kits for the IMS Front Ending solution kit of FIG. 21. The Answer Platform One ID field is an internal identifier which designates the front-end platform. In the IMS Front Ending Platform example, the value one in the first row refers to the OS/2 platform using IMS CS/2 as middleware. The Answer Platform Two ID field designates the second platform in the subsolution kit. In the example, the value two in the first row refers to the back end system running MVS with the IMS Transaction Manager (TM). The Answer Platform One ID and Answer Platform Two ID are used as keys for accessing a Platform table 330 described below. The ProtocolOneTwo ID is an internal identifier which designates the protocol used to communicate between the first and second platforms. In the example, the protocol is 3270 datastream. The ProtocolOneTwo ID is also used as a key for accessing the Protocol table 320. The LinkTypeOneTwo ID field is also an internal identifier which designates the link type between the first and second platforms. In the example, the link type is 3270 data stream. Other link examples include Resource Centric, Data Staging, Program-to-Program, and ASCII data stream. This link field is also used as a key for accessing the Link table 320. The table 304 can be extended if required to include additional sets of Answer PlatformThree ID, ProtocoOneTwoThree ID and Link TypeTwoThree ID fields.

Figure 25:
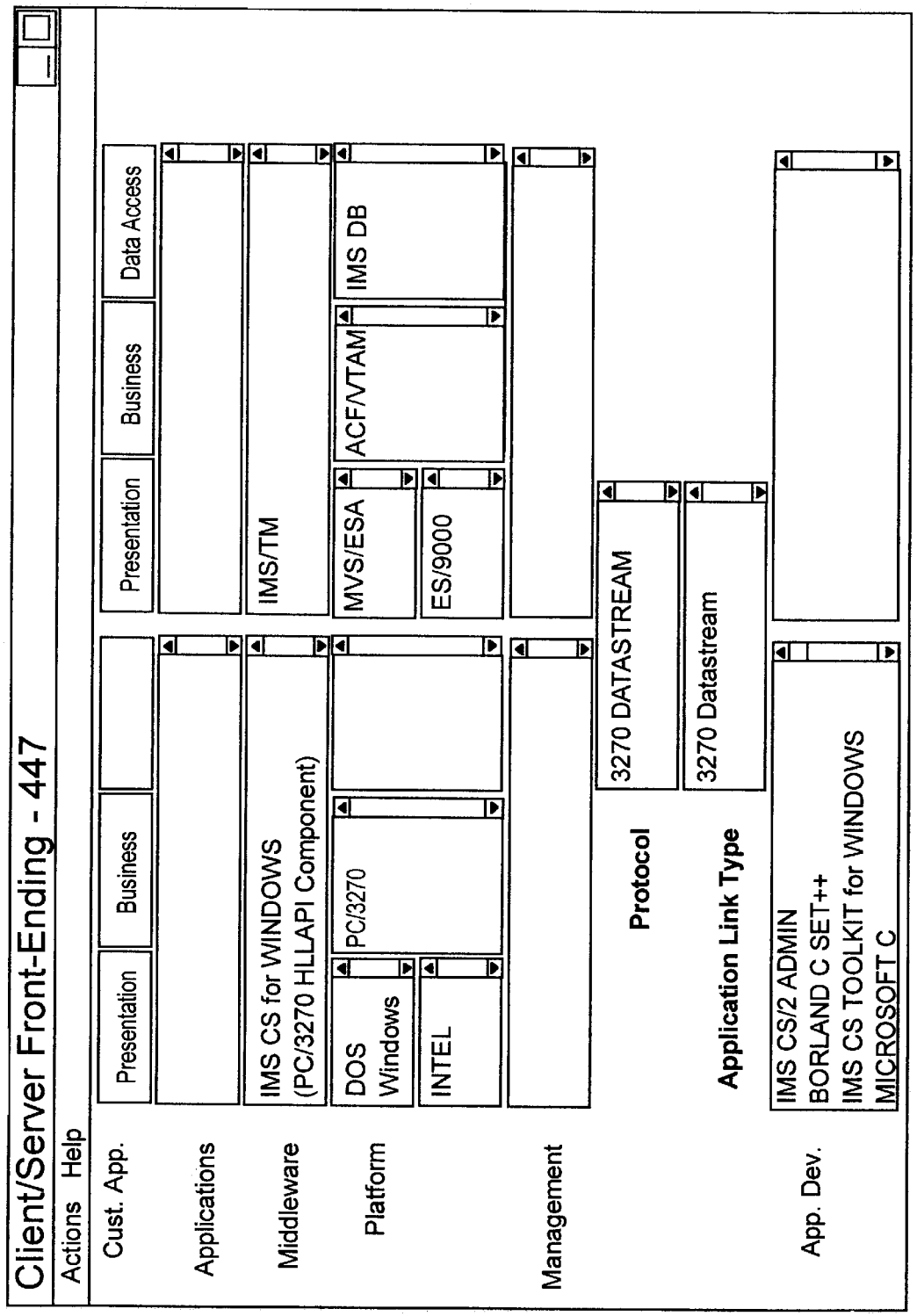

Table 304 also includes a second variation of the IMS front ending platform of FIG. 25 (in the second row indicated by subsolution kit "two") in which the Answer PlatformOne ID is three to represent a DOS front end system. The subsequent entries are the same as in the OS/2 front example described above because both front ends use the same type of protocol, link and answer/back end platform.

Platform Table 330 lists for each Product ID, an (Answer) Platform ID, a component/product type indicating how the component/product is being used, and an identification of the group for which the product is a member. The following is an example of platform table 330:

PLATFORM TABLE

| Platform ID | Product ID | Type | Group ID |
|---|---|---|---|
| 1 | 1 | Middleware | NULL |
| 1 | 2 | Operating System | NULL |
| 1 | 3 | Hardware | NULL |
| 1 | 4 | Networking | NULL |
| 1 | 5 | Application Development | NULL |
| 2 | 6 | Data Storage | 1 |
| 2 | 7 | Middleware | NULL |
| 2 | 8 | Operating System | NULL |
| . | . | . | . |
| . | . | Systems Management | . |

A Product Table 360 contains for each Product ID one row/record which lists an acronym for the product, a full product name, an abstract and a product type. The following is an example of the product table 360:

PRODUCT TABLE

| Product ID | Acronym | Full Product Name | Abstract | Product Type |
|---|---|---|---|---|
| 1 | IMS CS/2 | Client Server/2 | This product.. | NULL |
| 2 | OS/2 | Operating System/2 | This product.. | NULL |
| 3 | INTEL | INTEL | This product.. | Workstation |
| 4 | CM/2 | Communications Manager/2 | This product.. | NULL |
| 5 | IMS CS/2 Admin | Client Server/2 Administration | This product.. | NULL |
| 6 | IMS DB | IMS Database 2 | This product.. | NULL |
| 7 | IMS TM | IMS Transaction Manager | This product.. | NULL |
| 8 | MVS | | This product.. | NULL |
| 9 | DB2 | Database 2 | This product.. | NULL |
| . | . | . | . | . |

The possible products types for hardware are workstations, X-terminals, 3270 terminals and ASCII terminals. The possible product types for data storage are relational, hierarchical, indexed files, byte files and other. Other product categories such as "operating system" are not typed.

There are two types of variations in the solution kits. The first type of variation was described above in relation to FIGS. 21 and 25, and applies to a variation in a component/product which causes a change to another component/product for compatibility. In such a case, two separate subsolution kits are defined in table 304. The second type of variation applies to a variation in a component/product which does not require any other components/products in the solution kit to change. This second type of variation is called an "option". The options are listed in an Option Group Table 380 and are referenced by the Group ID of the Platform Table 330. The following is an example of the Option Group Table 380:

OPTION_GROUP TABLE

| Group ID | Product ID |
|---|---|
| 1 | 6 |
| 1 | 9 |
| . | . |
| . | . |

Each option is context sensitive. For example, Oracle and Informix might be option product substitutions for DB2/6000 when used as a database, but not option substitutes for DB2/6000 when used as middleware for its DRDA implementation. In the IMS front ending example, in the Platform table, Product ID six (IMS DB) associated with PlatformTwo ID/back end) is referenced by Group ID one. In the Option Group table, the two product identifications six (IMS DB), and nine (DB2) are members of the group with Group ID number one. Therefore, DB2 is a option/direct product substitution for IMS DB in the context of the back end platform in the IMS front ending solution kit.

A Key Phrase Table 390 stores key phrases associated with each solution kit. The following is an example of key phrase table 390:

KEY_PHRASE TABLE

| Solutionkit ID | Phrase | Class |
|---|---|---|
| 1 | Sales | 1 |
| 1 | Decision Support | 1 |
| 1 | Service | 1 |
| 1 | Systems Management | 2 |
| 1 | Technology | 2 |
| . | . | . |
| . | . | . |
| . | . | . |

The key phrase table is used to identify a subset list of solution kits that correspond to the type of solution kit identified by the user in the screens of FIGS. 5–17 and 19. For example, if a user selects "human resources/training" from the screen of FIG. 6, then all those solution kits categorized as human resources/training in the key phrase table are listed in the subset. If the user selects "human resources", then all those solution kits categorized as "human resources" with or without a suffix are listed in the subset. The key phrases are categorized into two classes—business solutions such as "sales" and "decision support" and technical characteristics such as "systems management" and "technology".

Searching For A Solution Kit

Figure 27A:
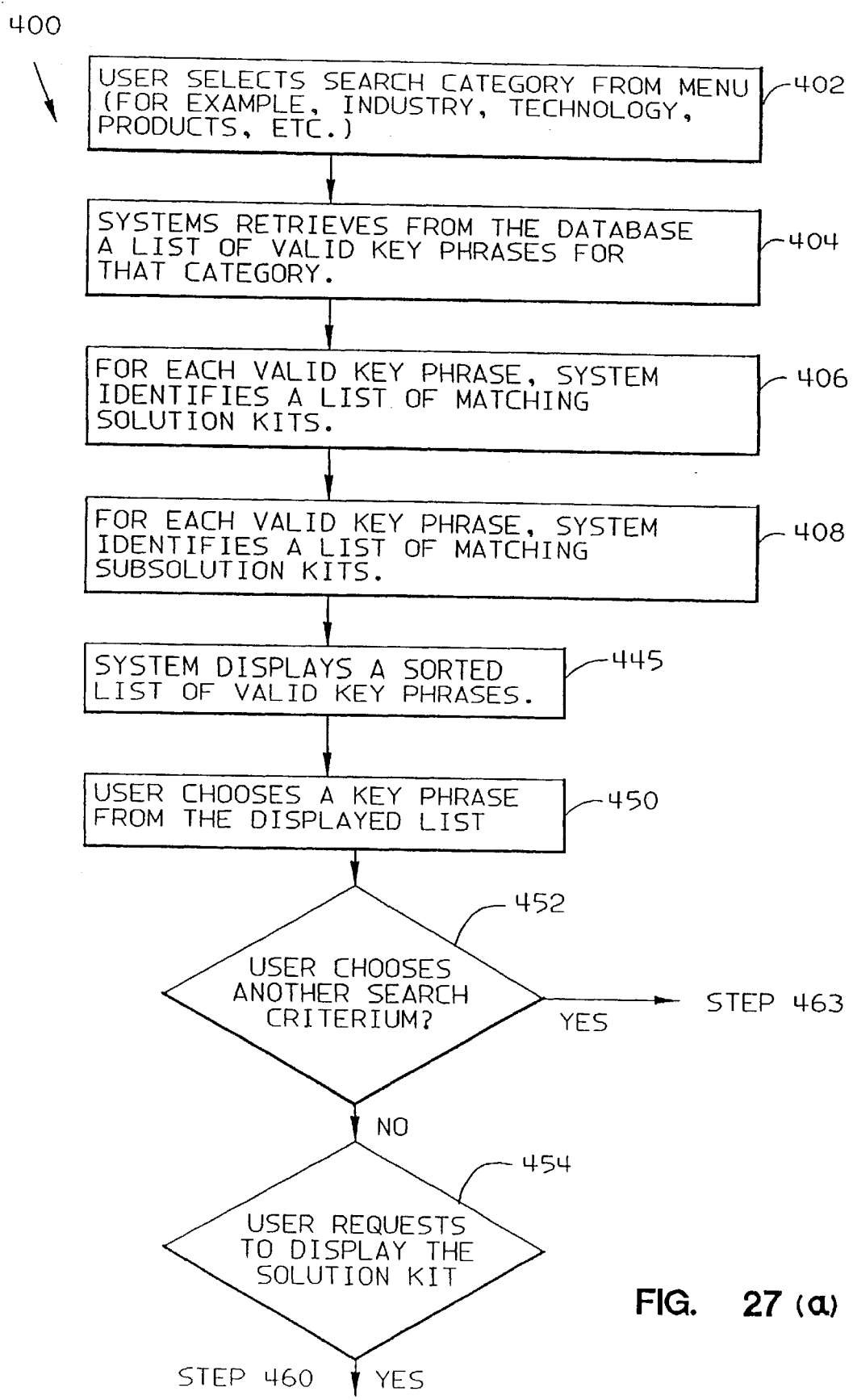
FIG. 27(a,b,c) is a flow chart which illustrates a searching process employed by the expert system of FIG. 1 to identify one or more solutions.
Figure 27B:
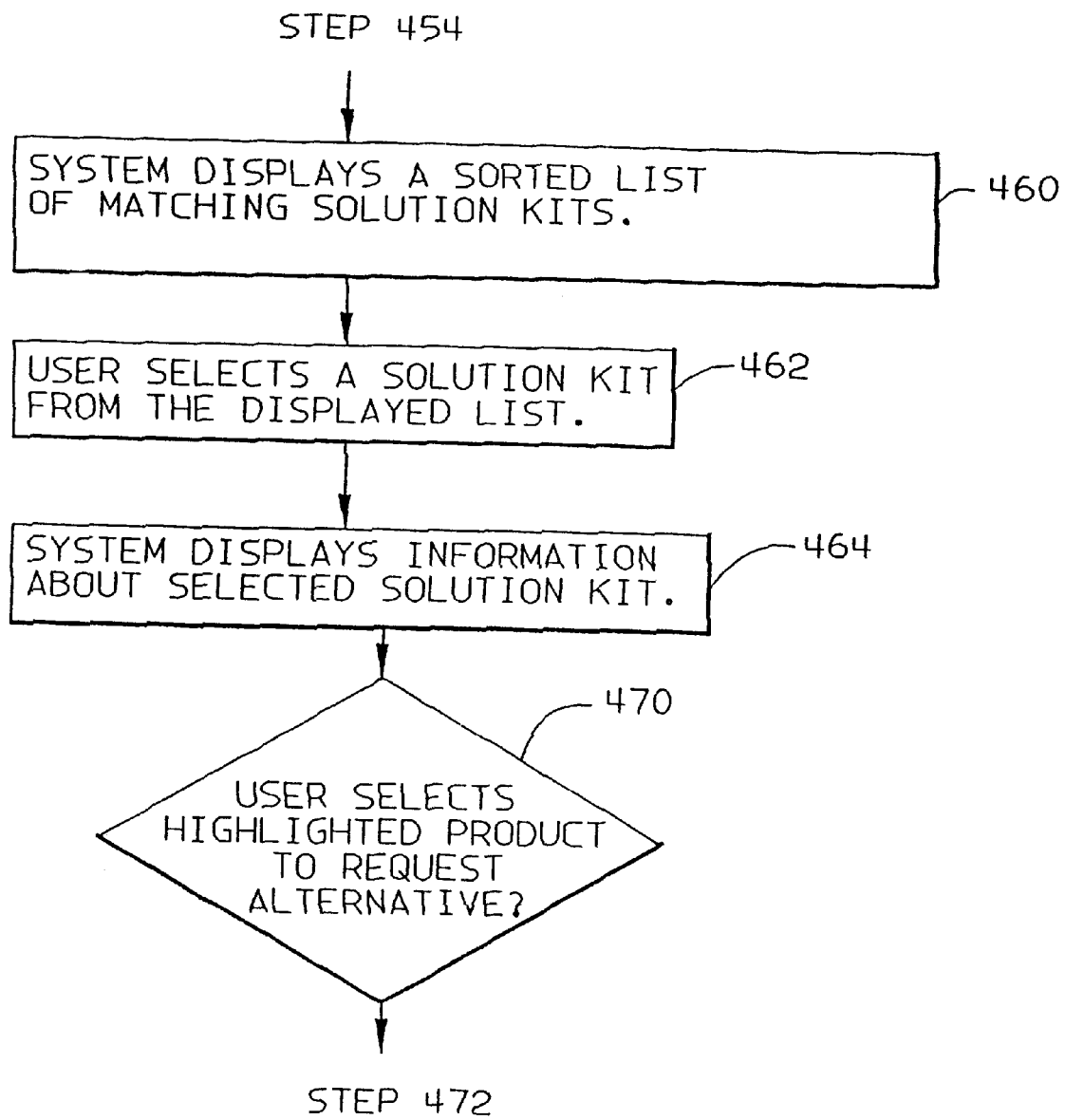
Figure 27C:
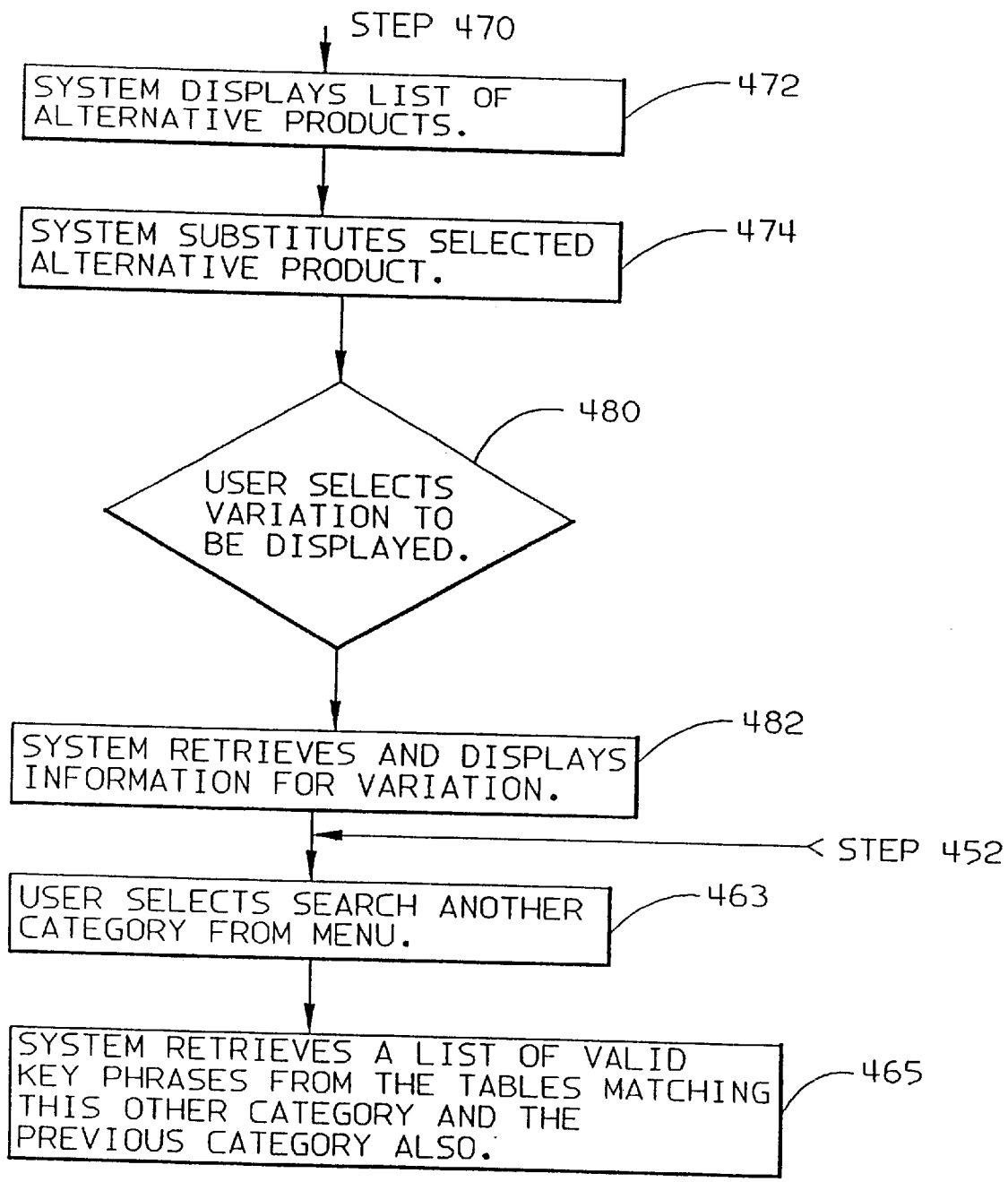

FIG. 27 illustrates a process 400 within program 52 for searching the foregoing data structures for the list of key phrases of FIGS. 5–17 and 19 and the subset list of solution kits resulting from selections from FIGS. 5–17 and 19. In step 402, a user selects preliminary search criteria from the screens of FIGS. 2–4. These are the screens that precede the key phrases of FIGS. 5–17 and 19. In response, system 50 identifies the list of key phrases that follow from the respective preliminary search criteria in FIGS. 3–4 (step 404) using a SQL query language as follows.

Step 404:
a) Define SQL statement to access keywords.

CURSOR X1=Select distinct (K.KEYWORD_PHRASE,K.SOLUTIONKIT_ID,S.SUB_SOLUTIONKIT_ID) FROM KEY_PHRASE K,SUB_SOLUTIONKITS WHERE CLASS=variable AND K.SOLUTIONKIT_ID=S.SOLUTIONKIT_ID ORDER BY K.KEYWORD_PHRASE;

The select clause specifies which columns of information are to be returned from the relational table. In this case, the KEYWORD_PHRASE and the SOLUTIONKIT_ID are selected from the KEYPHRASE table, and the SUB_SOLUTIONKIT_ID is selected from the SUB_SOLUTIONKIT table. Examples of values returned are "Sales", or "Decision Support". The SOLUTIONKIT_ID is an internal identifier designating a unique solutionkit. There is one record in the SOLUTIONKIT table for each unique SOLUTIONKIT_ID. This field, as shown in CURSOR X1, is also represented in the SUB_SOLUTIONKIT table. The SUB_SOLUTIONKIT_ID is an internal identifier designating one unique solutionkit variation. If a solutionkit has three variations, then there will be three records in the SUB_SOLUTIONKIT table, all having the same SOLUTIONKIT_ID but each having unique SUB_SOLUTIONKIT_IDs (see SUB_SOLUTIONKIT table).

The predicate CLASS=variable in WHERE clause specifies what type of keyword is being requested. CLASS 1 keywords refer to Business Solutions. The predicate K.SOLUTIONKIT_ID=S.SOLUTIONKIT_ID specifies which records, or key phrases, in the KEY_PHRASE table are associated with which records, or solutionkit variations, in the SUB_SOLUTIONKIT table.

b) Next, ASSIGN KEYPHRASES CLASS.

variable=1;

This statement designates the keywords to be Business Solutions.

c) Next, Open Cursor.

OPEN CURSOR X1;

This statement notifies the database manager to perform the join between the KEYPHRASE and SUB_SOLUTIONKIT table and position a cursor on the first record that satisfies all the predicates in the WHERE clause.

d) Next, Fetch Data

FETCH X1 INTO keyPhrase, solutionkitid, subSolutionkitId;

This statement requests the first record of information from the database, as defined by cursor X1, to be retrieved and placed into the specified variables listed in the FETCH X1 statement.

Figure 3:
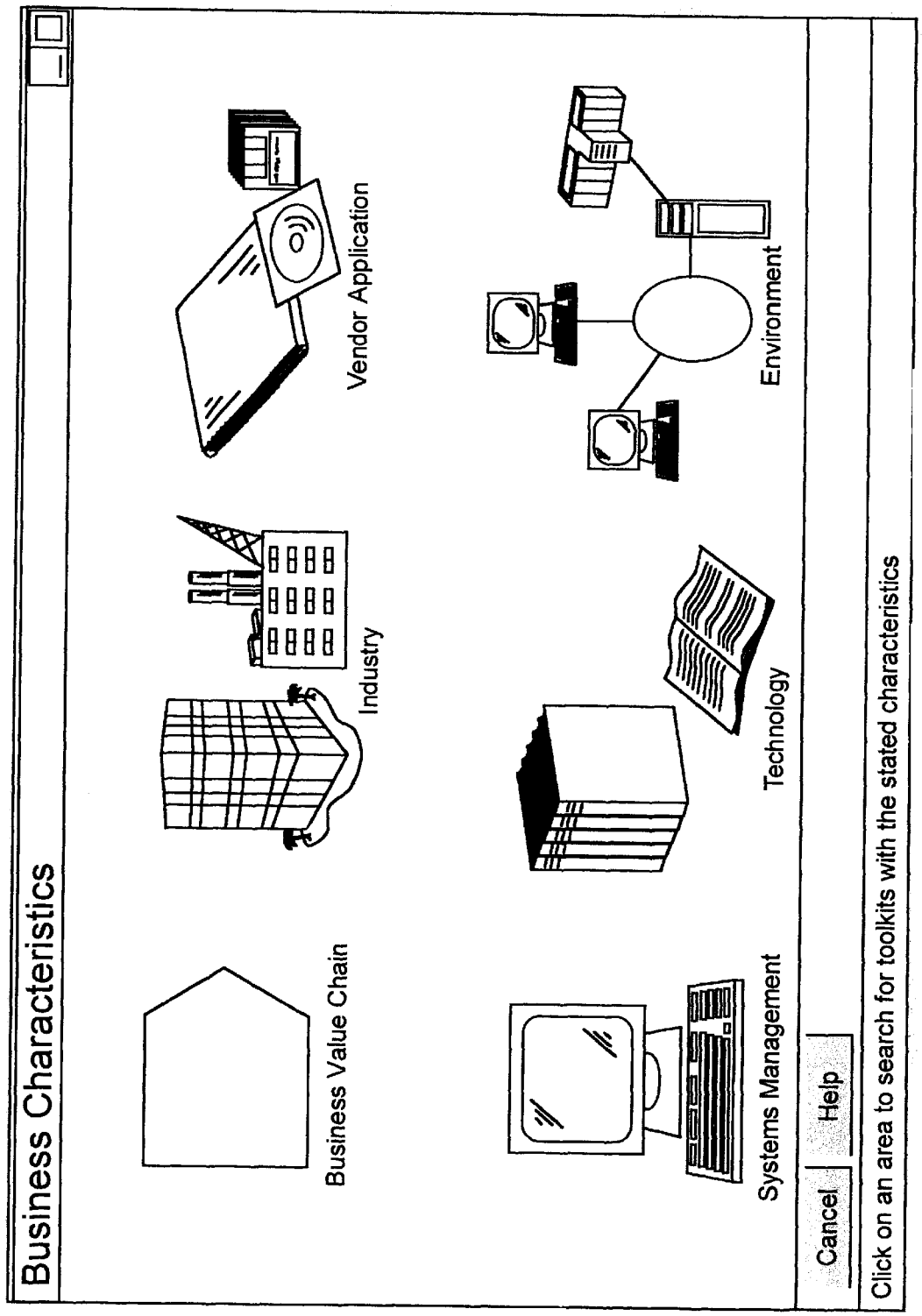
Figure 19:
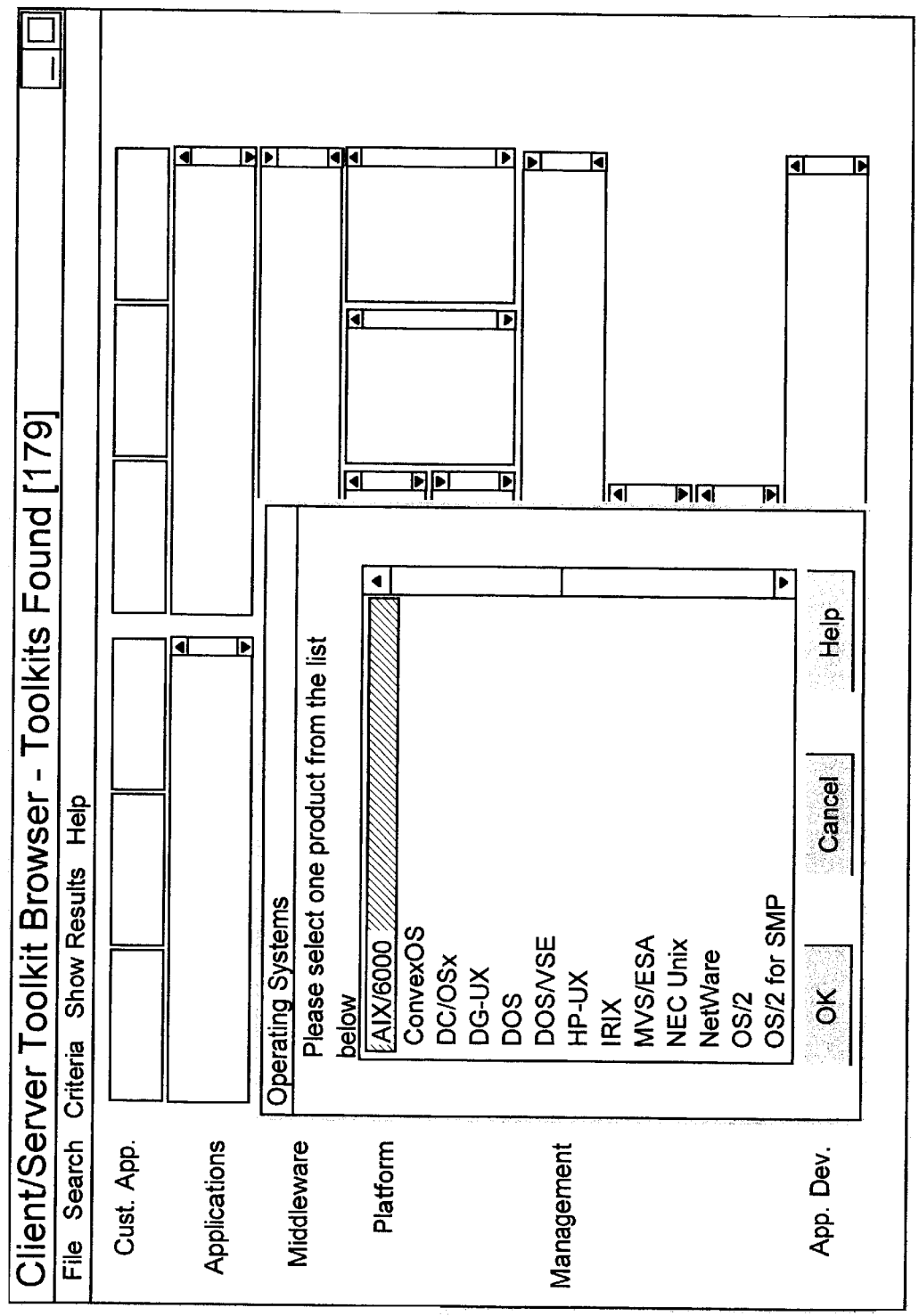

In doing so, system 50 searches the Key Phrase Table to identify every solution kit ID that matches each of the possible key phrases that may follow a selection from the screens of FIGS. 3, 4 or 19 (step 406). Then, system 50 searches the SubSolution kit table to identify every subosolution kit for each of the solution kits identified from the Key Phrase Table (step 408).

An internal structure is created which links together all keyphrases in the database in alphabetical order. For each keyphrase, a list of unique solutionkit IDs and subsolutionkit IDs is maintained identifying the associated solutionkit variations as shown below. Steps 404 and 406/408) are repeated until all keywords are retrieved from the database.

Steps 406 and 408:
BUILD TWO DIMENSIONAL LINK LIST

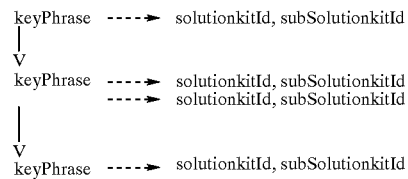

Next, system 50 displays the list of key phrases by name (one of FIGS. 5–18 and 20) that follows the screen of FIG. 2–4 (step 445). This list is derived from the link list structure created in step 406/408).

Next, the user selects a key phrase from the screen of FIGS. 5–17 or 19 which is displayed (step 450). This selected key phrase is used to index into the link list structure described in step 406/408. This structure is traversed to obtain all solutionkit variations, as represented by solutionkit IDs and subsolutionkit IDs, that are associated with the selected key phrase. These variations are then represented in a newly created structure called the answerList as shown below.

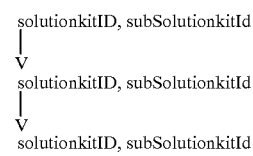

Assuming the user does not now select another solution criterium from FIG. 3 (decision 452) and requests to see the list of solutions kits by selecting "show results" from an action bar (decision 454), system 50 displays (step 460) the list of solution kits that meet the criteria set forth in steps 402 and 450. The titles are derived by scanning the answer list, as shown above. For each unique solutionkit ID, the solutionkit name is selected from the SOLUTIONKIT table and displayed in a dialog. Duplicate solutionkit IDs are omitted for this purpose.

Next, the user selects one of the solution kits by name for display (step 462) as a graphical illustration of FIG. 20. The user can then request that the graphical illustration of FIG. 20 be transferred into the graphical block diagram of FIG. 21, and in response, system retrieves the details of the selected solution kit from the PLATFORM table. PRODUCT, LINK, AND PROTOCOL tables are accessed and values are displayed (step 464).

If an alternate product exists for any of the displayed components, this component will be highlighted. If the user selects the highlighted component (decision 470), system 50 will display a screen such as FIG. 22 with a pull-down menu listing name, abstract, alternate products and data storage type. If the user selects "alternate products", then system 50 will display a list of the alternate products, for example, DB2 (step 472). System 50 obtained this list from the Option Group Table 380 using the Group ID from the Platform Table 330 as described above. If the user selects one of the listed alternate products, then system 50 will display a screen such as FIG. 23 which includes the acronym for the alternate product instead of the acronym for the product which it replaced (step 474).

The user can now request a list of options by selecting "Actions" from the menu bar on FIG. 21, and in response, system 50 will display a pull down menu indicating that there is one true "variation" for example, to the block design of FIG. 21. If the user then selects the variation—1 option from the pull down menu (decision 480), system 50 will display the variation, a screen such as FIG. 25 which is the same as that of FIG. 21 except for changes in the front end platform (step 482). System 50 obtained the information for the variation from the Subsolution Kit Table 304 which is indexed by Solution Kit ID.

Referring back to decision 452, if the user selects another search criterium from the screen of FIG. 3 and follow-up screens to be "ANDed" with the first search criterium from FIG. 3 and follow-up screens (step 463), system 50 then searches for a list of solution kits that satisfy both criteria (step 465). Step 465 is implemented as follows.

CURSOR X2=SELECT KEYWORD_PHRASE FROM KEY_PHRASE WHERE SOLUTIONKIT_ID-solutionkitid AND CLASS=var ORDER BY KEYWORD_PHRASE;

In this scenario, some search criteria were previously specified and an answer list was previously created, as shown in step 406/408 above. For all subsequent criteria specified, the answer list will be further refined. In this case, the user requests to view valid Business Solutions key phrases from which to choose. In case one, all valid key phrases are retrieved from the database. Also in this scenario, only those key phrases associated with the remaining solutionkits represented in the answer list should be retrieved. This is accomplished by retrieving the first unique solutionkit ID from the answer list. This solutionkit ID is assigned to the solutionkitid variable in the above SQL statement. The variable "var" is assigned the value one to specify Business Solutions. The cursor is then opened, fetched and closed creating a similar structure as shown in step 404 d). The variable solutionkitID in the SQL statement is then reassigned to the next unique solutionkit ID in the answer list. This process is repeated until the answer list is exhausted. Then, system 50 continues with step 406 as described above.

Based on the foregoing, an expert system according to the present invention has been disclosed. However, numerous modifications and substitutions can be made without deviating from the scope of the present invention. For example, different types of characteristics can be used to select a subset of solution kits. Also, three or more "tier" solution kits can be included in the set of solution kits. A three tier solution kit comprises a front end hardware platform, an intermediary server hardware platform, a backend hardware platform, software associated with the three hardware platforms, a first communication facility (protocols and links) to link the frond end and intermediary server hardware platforms and a second communication facility (protocols and links) to link the intermediary server hardware and backend hardware platforms. Therefore, the invention has been disclosed by way of illustration and not limitation, and reference should be made to the following claims to determine the scope of the present invention.

We claim:

1. An expert system for determining a computer solution, said system comprising:
   means for storing descriptions or diagrams of a set of respective pre-defined computer solutions, each of said computer solutions comprising a front end platform, a back-end platform and a commution linking said platforms together;
   means for directing display of different uses of said computer solutions; and
   means, responsive to user selection of one or more of said uses for identifying a subset of said computer solutions corresponding to the selected uses.

2. A system as set forth in claim 1 further comprising means for displaying the diagrams corresponding to the selected uses and other selections, if any.

3. A system as set forth in claim 2 further comprising means, responsive to user selection of one of said diagrams which is displayed, for directing display of a block diagram representing a computer solution corresponding to said one diagram.

4. A system as set forth in claim 3 wherein the means responsive to user selection of said one diagram directs display of an indication in said block diagram that a component of the corresponding predefined solution can be replaced by another component and still yield a solution within said set.

5. A system as set forth in claim 1 wherein the means for directing display of different uses of said computer solutions displays only uses that, if selected, always identify solutions within said set.

6. A system as set forth in claim 2 wherein one of said diagrams includes an indication that a variation of the corresponding predetermined solution exists, said variation differing from said predetermined solution by more than one component.

7. A system as set forth in claim 6 further comprising means, responsive to user request to view said variation, for directing display of said variation.

8. An expert system as set forth in claim 1 further comprising means for notifying a user of said expert system of the identified computer solutions.

9. A method for determining a computer solution, said method comprising the computer implemented steps of:
   storing descriptions or diagrams of a set of respective pre-defined computer solutions, each of said computer solutions comprising a front end platform, a back-end platform and a communication facility linking said platforms together;
   directing display of different uses of computer solutions within said set;
   receiving user selection of one or more of said uses; and
   identifying a subset of said computer solutions corresponding to the selected uses.

10. A method as set forth in claim 9 further comprising the step of displaying the diagrams corresponding to the selected uses and other selections, if any.

11. A method as set forth in claim 10 further comprising the step of:
   receiving user selection of one of said diagrams within said subset, and in response, directing display of a block diagram representing a computer solution corresponding to said one diagram.

12. A method as set forth in claim 11 wherein, in response to the step of receiving user selection of said one diagram, further comprising the computer implemented step of directing display of an indication in said block diagram that a component of the corresponding predefined solution can be replaced by another component and still yield a solution within said set.

13. A method as set forth in claim 9 further comprising the computer implemented steps of receiving user selection of one of said computer solutions of said subset, and in response, directing display of an indication that a variation of said one computer solution exists, said variation differing from said one computer solution by more than one component.

14. A method as set forth in claim 13 further comprising the computer implemented steps of receiving a user request to view said variation, and in response, directing display of said variation.

15. A method as set forth in claim 9 further comprising the step of notifying a user of said expert system of the identified computer solutions.

16. A computer program product for determining a computer solution, said program product comprising:
- a computer readable medium;
- first program instruction means for instructing a processor to store descriptions or diagrams of a set of respective pre-defined computer solutions, each of said computer solutions comprising a front end platform, a back-end platform and a communication facility linking said platforms together;
- second program instruction means for instructing a processor to direct display of different uses of said computer solutions; and
- third program instruction means for instructing a processor to receive user selection of one or more of said uses, and in response, identify a subset of said computer solutions corresponding to the selected use(s); and wherein each of said program instruction means is recorded on said medium.

17. A computer program product as set forth in claim 16 further comprising fourth program instruction means for instructing a processor to display the diagrams corresponding to the selected uses and other selections, if any; and wherein said fourth program instruction means is recorded on said medium.

18. A computer program product as set forth in claim 17 further comprising fifth program instruction means for instructing a processor to respond to selection of one of said diagrams by directing display of a block diagram representing a computer solution corresponding to said one diagram; and wherein said fifth program instruction means is recorded on said medium.

* * * * *